United States Patent
Nagai et al.

(10) Patent No.: US 8,903,982 B2
(45) Date of Patent: Dec. 2, 2014

(54) COMPUTER SYSTEM, MANAGEMENT SERVER AND CONFIGURATION INFORMATION ACQUISITION METHOD

(75) Inventors: Takayuki Nagai, Machida (JP); Daisuke Shinohara, Yokohama (JP)

(73) Assignee: Hitachi, Ltd., Tokyo (JP)

(*) Notice: Subject to any disclaimer, the term of this patent is extended or adjusted under 35 U.S.C. 154(b) by 727 days.

(21) Appl. No.: 12/198,192

(22) Filed: Aug. 26, 2008

(65) Prior Publication Data
US 2009/0292789 A1   Nov. 26, 2009

(30) Foreign Application Priority Data
May 20, 2008   (JP) .................................. 2008-132274

(51) Int. Cl.
| G06F 15/173 | (2006.01) |
| G06F 3/06 | (2006.01) |
| H04L 12/24 | (2006.01) |
| G06F 11/34 | (2006.01) |

(52) U.S. Cl.
CPC ............ *G06F 3/0653* (2013.01); *G06F 3/0632* (2013.01); *G06F 3/067* (2013.01); *H04L 41/0859* (2013.01); *G06F 2201/81* (2013.01); *H04L 41/5035* (2013.01); *G06F 3/0607* (2013.01); *H04L 41/0853* (2013.01); *G06F 11/3485* (2013.01)
USPC ............................ 709/224; 711/114; 714/6.22

(58) Field of Classification Search
USPC ........................................................ 709/224
See application file for complete search history.

(56) References Cited

U.S. PATENT DOCUMENTS

| 6,802,062 | B1 * | 10/2004 | Oyamada et al. ................. 718/1 |
| 7,028,137 | B2 * | 4/2006 | Nashimoto et al. ........... 711/112 |
| 7,194,538 | B1 * | 3/2007 | Rabe et al. ..................... 709/224 |
| 7,216,263 | B2 * | 5/2007 | Takaoka et al. ................. 714/47 |
| 7,523,254 | B2 * | 4/2009 | Takeda et al. .................. 711/111 |
| 7,555,548 | B2 * | 6/2009 | Winfield et al. .............. 709/224 |
| 7,769,849 | B2 * | 8/2010 | Jibbe et al. .................... 709/224 |
| 7,844,701 | B2 * | 11/2010 | Ramany et al. ............... 709/224 |
| 7,886,031 | B1 * | 2/2011 | Taylor et al. .................. 709/221 |

(Continued)

FOREIGN PATENT DOCUMENTS

| JP | 08-063298 | 3/1996 |
| JP | 2003-108420 | 4/2003 |

(Continued)

OTHER PUBLICATIONS le;.4qOffice Action in JP 2008-132274, dispatched Dec. 27, 2011 (2 pgs.) [in Japanese]; including partial English language translation of relevant parts (2 pgs.).

*Primary Examiner* — Greg C Bengzon

(74) *Attorney, Agent, or Firm* — Antonelli, Terry, Stout & Kraus, LLP.

(57) ABSTRACT

A computer system includes a management server which includes an acquisition unit for acquiring the configuration information and performance information of the storage apparatus and the host computer respectively at different timings, and a comparison unit for comparing, when a configuration change of the storage apparatus is commanded externally, a performance value of components in the storage apparatus subject to the configuration change and a performance value of components in a connection relationship with the components. The acquisition unit determines that an unknown component has been added in the storage apparatus when the difference in the performance values compared with the comparison unit exceeds a predetermined threshold, and reacquires configuration information from the storage apparatus.

18 Claims, 21 Drawing Sheets

THRESHOLD EXCEEDANCE WARNING SCREEN

THRESHOLD EXCEEDANCE WARNING

THRESHOLD EXCEEDANCE CONTENT 81A

| APPARATUS ID | DEVICE ID | METRIC | PERFORMANCE VALUE | ALERT EXECUTION THRESHOLD VALUE |
|---|---|---|---|---|
| SYS1 | RG1 | UNIT TIME I/O AMOUNT | 1200 | 1000 |

CONNECTED VOLUME LIST 81B

| APPARATUS ID | PORT ID | RAID GROUP ID | VOLUME ID | DESTINATION HOST ID | DESTINATION DRIVE NAME |
|---|---|---|---|---|---|
| SYS1 | PORT1 | RG1 | VOL1 | HOST1 | E: |
|  | PORT1 | RG1 | VOL2 | HOST1 | F: |

(56) References Cited

U.S. PATENT DOCUMENTS

| | | |
|---|---|---|
| 2003/0061331 A1 | 3/2003 | Nakamura et al. |
| 2004/0123180 A1 | 6/2004 | Soejima et al. |
| 2004/0210791 A1 | 10/2004 | Akagawa et al. |
| 2005/0119996 A1 | 6/2005 | Ohata et al. |
| 2006/0265497 A1* | 11/2006 | Ohata et al. ............ 709/224 |
| 2007/0027985 A1* | 2/2007 | Ramany et al. ............ 709/224 |
| 2008/0098110 A1 | 4/2008 | Takeda et al. |
| 2009/0089412 A1 | 4/2009 | Nagai et al. |
| 2009/0150542 A1* | 6/2009 | Yahiro et al. ............ 709/224 |

FOREIGN PATENT DOCUMENTS

| | | |
|---|---|---|
| JP | 2004-246852 | 9/2004 |
| JP | 2004-318741 | 11/2004 |
| JP | 2005-062941 | 3/2005 |
| JP | 2005-157933 | 6/2005 |
| JP | 2009-20703 | 1/2009 |
| JP | 2009-087020 | 4/2009 |
| JP | 2009-145962 | 7/2009 |

* cited by examiner

LOGICAL VOLUME MANAGEMENT TABLE

| DRIVE NAME | iSCSI INITIATOR NAME | DESTINATION iSCSI TARGET | LUN ID |
|---|---|---|---|
| E: | com.hitachi.sv1 | com.hitachi.sto1 | 0 |
| F: | com.hitachi.sv1 | com.hitachi.sto1 | 1 |
| : | : | : | : |

FIG.8

VOLUME MANAGEMENT TABLE

| VOLUME ID | CAPACITY | RAID GROUP ID | TARGET ID | LUN ID | NEW ADDITION FLAG |
|---|---|---|---|---|---|
| VOL1 | 20GB | RG1 | TG1 | 0 | No |
| VOL2 | 20GB | RG1 | TG1 | 1 | No |
| VOL3 | 20GB | RG1 | TG2 | 0 | No |
| VOL4 | 20GB | RG1 | TG2 | 1 | No |
| VOL5 | 40GB | RG2 | TG3 | 0 | No |
| VOL6 | 40GB | RG2 | TG3 | 1 | No |
| : | : | : | : | : | : |

FIG.9

RAID GROUP MANAGEMENT TABLE

| RAID GROUP ID | RAID LEVEL | CONFIGURATION DISK ID | CAPACITY |
|---|---|---|---|
| RG1 | RAID1 | DISK1, DISK2 | 100GB |
| RG2 | RAID1 | DISK3, DISK4 | 100GB |
| : | : | : | : |

FIG.10

PORT MANAGEMENT TABLE

| PORT ID | TARGET LIST |
|---------|-------------|
| PORT1   | TG1, TG2    |
| PORT2   | TG3         |
| :       | :           |

29A / 29B / 29

FIG.11 iSCSI TARGET MANAGEMENT TABLE

| TARGET ID | iSCSI TARGET NAME | CONNECTION PERMIT iSCSI INITIATOR |
|-----------|-------------------|-----------------------------------|
| TG1       | com.hitachi.sto1  | com.hitachi.sv1, com.hitachi.sv11 |
| TG2       | com.hitachi.sto2  | com.hitachi.sv2                   |
| TG3       | com.hitachi.sto3  | com.hitachi.sv3                   |
| :         | :                 | :                                 |

APPARATUS PERFORMANCE MANAGEMENT TABLE

| APPARATUS ID | DEVICE ID | METRIC | PERFORMANCE VALUE (IOPS) | ALERT EXECUTION THRESHOLD |
|---|---|---|---|---|
| SYS1 | RG1 | UNIT TIME I/O AMOUNT | 600 | 500 |
| SYS1 | RG2 | UNIT TIME I/O AMOUNT | 200 | 500 |
| SYS1 | PORT1 | UNIT TIME I/O AMOUNT | 300 | 1000 |
| SYS1 | PORT2 | UNIT TIME I/O AMOUNT | 400 | 1000 |
| SYS1 | VOL1 | UNIT TIME I/O AMOUNT | 40 | 100 |
| SYS1 | VOL2 | UNIT TIME I/O AMOUNT | 20 | 100 |
| SYS1 | VOL3 | UNIT TIME I/O AMOUNT | 30 | 100 |
| SYS1 | VOL4 | UNIT TIME I/O AMOUNT | 40 | 100 |
| : | : | : | : | : |

FIG.13

DEVICE CONNECTION MANAGEMENT TABLE

| APPARATUS ID | VOLUME ID | PORT ID | RAID GROUP ID | DESTINATION HOST ID | DESTINATION DRIVE NAME |
|---|---|---|---|---|---|
| SYS1 | VOL1 | PORT1 | RG1 | HOST1 | E: |
| | VOL2 | PORT1 | RG1 | HOST1 | F: |
| | VOL3 | PORT2 | RG1 | HOST2 | E: |
| | VOL4 | PORT2 | RG1 | HOST2 | F: |
| : | : | : | : | : | : |

DETECTION-TARGET APPARATUS MANAGEMENT TABLE

| DETECTION-TARGET ADDRESS | USER NAME | PASSWORD |
|---|---|---|
| 192.168.5.1-192.168.5.255 | user | pwd |
| 192.168.6.1-192.168.6.100 | Admin | admin |
| 192.168.6.101-192.168.6.255 | test | test |
| : | : | : |

MONITORING-TARGET APPARATUS MANAGEMENT TABLE

| IP ADDRESS | APPARATUS TYPE | USER NAME | PASSWORD |
|---|---|---|---|
| 192.168.5.5 | HOST | user | pwd |
| 192.168.5.6 | HOST | Admin | admin |
| 192.168.5.10 | STORAGE | test | test |
| : | : | : | : |

FIG.16 iSCSI NAME MANAGEMENT TABLE

| IP ADDRESS | iSCSI NAME | TYPE |
|---|---|---|
| 192.168.5.2 | com.hitachi.sv1 | INITIATOR |
| 192.168.5.3 | com.hitachi.sv2 | INITIATOR |
| 192.168.5.4 | com.hitachi.sto1 | TARGET |
| : | : | : |

FIG.17

THRESHOLD EXCEEDANCE WARNING SCREEN

THRESHOLD EXCEEDANCE WARNING

THRESHOLD EXCEEDANCE CONTENT

| APPARATUS ID | DEVICE ID | METRIC | PERFORMANCE VALUE | ALERT EXECUTION THRESHOLD VALUE |
|---|---|---|---|---|
| SYS1 | RG1 | UNIT TIME I/O AMOUNT | 1200 | 1000 |

CONNECTED VOLUME LIST

| APPARATUS ID | PORT ID | RAID GROUP ID | VOLUME ID | DESTINATION HOST ID | DESTINATION DRIVE NAME |
|---|---|---|---|---|---|
| SYS1 | PORT1 | RG1 | VOL1 | HOST1 | E: |
| | PORT1 | RG1 | VOL2 | HOST1 | F: |

COMPUTER SYSTEM, MANAGEMENT SERVER AND CONFIGURATION INFORMATION ACQUISITION METHOD

CROSS-REFERENCES

This application relates to and claims priority from Japanese Patent Application No. 2008-132274, filed on May 20, 2008, the entire disclosure of which is incorporated herein by reference.

BACKGROUND

The present invention can be suitably applied to a management server for managing a storage system to be used in a computer system.

In a computer system configured from a plurality of host computers and storage apparatuses, a storage apparatus often becomes the bottleneck of the overall system. Thus, in order for the storage apparatus to exhibit the highest possible performance, it is important to acquire the various performance index values during the construction phase or operation phase of the system, and analyze whether prescribed performance values are being obtained.

In a configuration where a single storage apparatus is to be shared and used by a plurality of servers, there are cases where the I/O processing from a plurality of services to a specific resource in the storage apparatus overlaps, which consequently induces serious performance deterioration.

A tool provided by the storage apparatus is able to browse and analyze the I/O amount being processed by a specific resource in the storage apparatus. Nevertheless, with this method, it is difficult to identify the cause of the I/O conflict performance issue induced by the configuration of the host computer connected to the storage apparatus. In other words, specifically, it is difficult to identify the host computer group that is placing an I/O load on a specific resource in the storage apparatus or the components causing deterioration in the performance.

Thus, Japanese Patent Laid-Open Publication No. 2005-062941 discloses technology for easily identifying the host computer group that is inducing a conflict of I/O in a resource of the storage apparatus or the components causing deterioration in the performance, by: searching and detecting a host computer group using a resource in a specific storage apparatus from the mapping information between the storage apparatus and the host computer, creating a report of the I/O conflict narrowed down only to the performance data of that host computer group, and presenting this report to a system administrator.

SUMMARY

System performance management software of a management server, when executed by a processor, monitors the configuration and performance of a plurality of host computers and storage apparatuses. Specifically, the system performance management software periodically acquires information such as the performance and internal configuration of components including ports, controllers, caches, volumes, and RAID groups in the storage apparatus, and the performance and destination storage port of logical volumes in the host computer, and retains such information in an internal database.

As information to be acquired by the system performance management software from the storage apparatuses and host computers, there is configuration information and performance information. Configuration information includes the interconnection relationship of the internal components of the storage apparatus and the host computer, and various types of configuration information of the internal components of the storage apparatus and the host computer. Performance information includes a list of internal components of the host computer and the storage apparatus, and the performance values thereof.

The system performance management software, in order to alleviate the processor load in the storage apparatus, acquires configuration information less frequently than acquiring performance information since the configuration information is changed relatively less frequently. This is because if the configuration information is acquired excessively, the processor load in the storage apparatus will increase, and the I/O performance of business data in the storage apparatus will be affected.

Nevertheless, if a new volume is added to the storage apparatus and a host computer to be connected to the volume is added to the computer system, and a storage performance failure occurs immediately after the operation of this modified configuration is started, depending on the timing of the addition, only the performance information will be updated while the configuration information of the management server is not updated.

In this case, access to the storage apparatus will increase due to the increase in the host computers to be connected. Thus, even if the components in the storage apparatus exceeds a threshold value, since the configuration information of the management server is information before the configuration change, the newly added host will not be displayed as the destination even when displaying which host computer is being used by the internal components of the storage apparatus exceeding the threshold value. Consequently, the administrator is unable to take appropriate measures against the threshold exceedance.

In order to overcome this problem, a method of acquiring the configuration information simultaneously with acquiring the performance information may be considered. Nevertheless, in this case, there is a problem in that the frequency of acquiring the configuration information will increase, and an excessive load is placed on the storage apparatus. Thus, an object of the present invention is to prevent the foregoing phenomena.

The present invention was devised in view of the foregoing points, and proposes a computer system capable of dramatically improving the operation efficiency, as well as a management server and a configuration information acquisition method.

In order to achieve the foregoing object, the present invention provides a computer system comprising a storage apparatus configured from a plurality of components and including a volume as a storage area to be used by a host computer, and a management server connected to the storage apparatus and the host computer via a network, and for managing configuration information and performance information of the storage apparatus and the host computer. The management server includes an acquisition unit for acquiring the configuration information and performance information of the storage apparatus and the host computer respectively at different timings, and a comparison unit for comparing, when a configuration change of the storage apparatus is commanded externally, a performance value of components in the storage apparatus subject to the configuration change and a performance value of components in a connection relationship with the components. The acquisition unit determines that an unknown component has been added in the storage apparatus when the difference in the performance values compared with the comparison unit is of a certain level or greater, and reacquires configuration information from the storage apparatus.

In other words, with the computer system of the present embodiment, when the system administrator implements the configuration change of a storage apparatus via a storage management server that exists separately from a management server, the management server automatically detects the configuration change, and acquires the configuration information from the storage apparatus. With a computer system of another embodiment, when the system administrator implements the configuration change of a storage apparatus via a storage management server existing separately from a management server, the management server automatically detects the configuration change, and detects and acquires the configuration information of the storage apparatus and a host computer using that storage apparatus. With a computer system of yet another embodiment, when the system administrator implements the configuration change of a storage apparatus via a storage management server existing separately from a management server, the management server automatically detects the configuration change, uses an identifier management server to acquire an address of a host computer to be connected to the storage apparatus, and acquires the configuration information from the storage apparatus and a host computer using that storage apparatus.

The present invention additionally provides a management server connected to a storage apparatus and a host computer via a network and for managing configuration information and performance information of the storage apparatus and the host computer. The management server includes an acquisition unit for acquiring the configuration information and performance information of the storage apparatus and the host computer respectively at different timings, and a comparison unit for comparing, when a configuration change of the storage apparatus is commanded externally, a performance value of components in the storage apparatus subject to the configuration change and a performance value of components in a connection relationship with the components. The acquisition unit determines that an unknown component has been added in the storage apparatus when the difference in the performance values compared with the comparison unit is of a certain level or greater, and reacquires configuration information from the storage apparatus.

The present invention further provides a configuration information acquisition method of a management server connected to a storage apparatus and a host computer via a network and for managing configuration information and performance information of the storage apparatus and the host computer. This configuration information acquisition method includes a first step of an acquisition unit acquiring the configuration information and performance information of the storage apparatus and the host computer respectively at different timings, a second step of a comparison unit for comparing, when a configuration change of the storage apparatus is commanded externally, a performance value of components in the storage apparatus subject to the configuration change and a performance value of components in a connection relationship with the components, and a third step of the acquisition unit determining that an unknown component has been added in the storage apparatus when the difference in the performance values compared at the second step is of a certain level or greater, and reacquiring configuration from the storage apparatus.

Accordingly, since the acquisition of the configuration information is limited to the timing of detecting a configuration change in the storage apparatus, it is possible to effectively prevent the increase in the frequency of acquiring the configuration information and an excessive load being placed on the storage apparatus, and update the configuration information of the storage apparatus to the latest status when the difference in the performance values is of a certain level or greater. Thereby, even if it is immediately after the implementation of a configuration change, the configuration of that storage apparatus can be accurately displayed to the administrator via the management server, and the administrator is able to take appropriate measures against an abnormality in the storage apparatus.

According to the present invention, it is possible to realize a computer system capable of dramatically improving the operation efficiency, as well as a management server and a configuration information acquisition method.

DESCRIPTION OF DRAWINGS

FIG. 8 is a diagram showing a configuration example of a volume management table stored in the storage apparatus according to the present invention;

FIG. 9 is a diagram showing a configuration example of a RAID group management table stored in the storage apparatus according to the present invention;

FIG. 10 is a diagram showing a configuration example of a port management table stored in the storage apparatus according to the present invention;

FIG. 11 is a diagram showing a configuration example of an iSCSI target management table stored in the storage apparatus according to the present invention;

FIG. 12 is a diagram showing a configuration example of an apparatus performance management table stored in the management server according to the present invention;

FIG. 13 is a diagram showing a configuration example of a device connection management table stored in the management server according to the present invention;

FIG. 14 is a diagram showing a configuration example of a detection-target apparatus management table stored in the management server according to the present invention;

FIG. 15 is a diagram showing a configuration example of a monitoring-target apparatus management table stored in the management server according to the present invention;

FIG. 16 is a diagram showing a configuration example of an iSCSI name management table stored in the iSNS server according to the present invention;

FIG. 17 is an example of a screen displayed by the management server according to the present invention;

DETAILED DESCRIPTION

An embodiment of the present invention is now explained with reference to the attached drawings. The present invention, however, shall not be limited by the following embodiments.

(1) First Embodiment

The first embodiment explains a method where, when the system administrator implements a configuration change of a storage apparatus via a storage management server that exists separately from a management server, the management server automatically detects the configuration change, and acquires the configuration information from the storage apparatus.

FIG. 1 to FIG. 6 show the configuration of a computer system 1 and the configuration of apparatuses to be connected to the computer system 1. FIG. 7 to FIG. 16 show the management information stored in the respective apparatuses.

Figure 1:
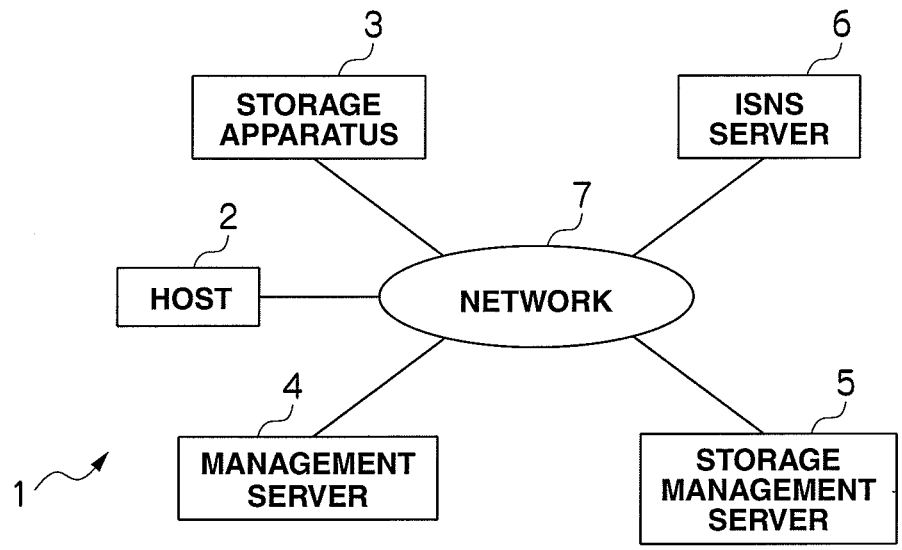
FIG. 1 is a diagram showing a schematic configuration example of a computer system according to the present invention.

FIG. 1 shows the configuration of the computer system 1. The computer system 1 is configured by a host computer 2, a storage apparatus 3, a management server 4, a storage management server 5, and an iSNS (Internet Storage Name Service) server 6 being connected via a network 7. In the ensuing explanation, although the processing subject of the various types of processing is explained as a program in order to clarify the processing contents of a processor of the respective apparatuses to execute the respective programs, in reality, it goes without saying that the corresponding processor executes the processing based on the program.

Figure 2:
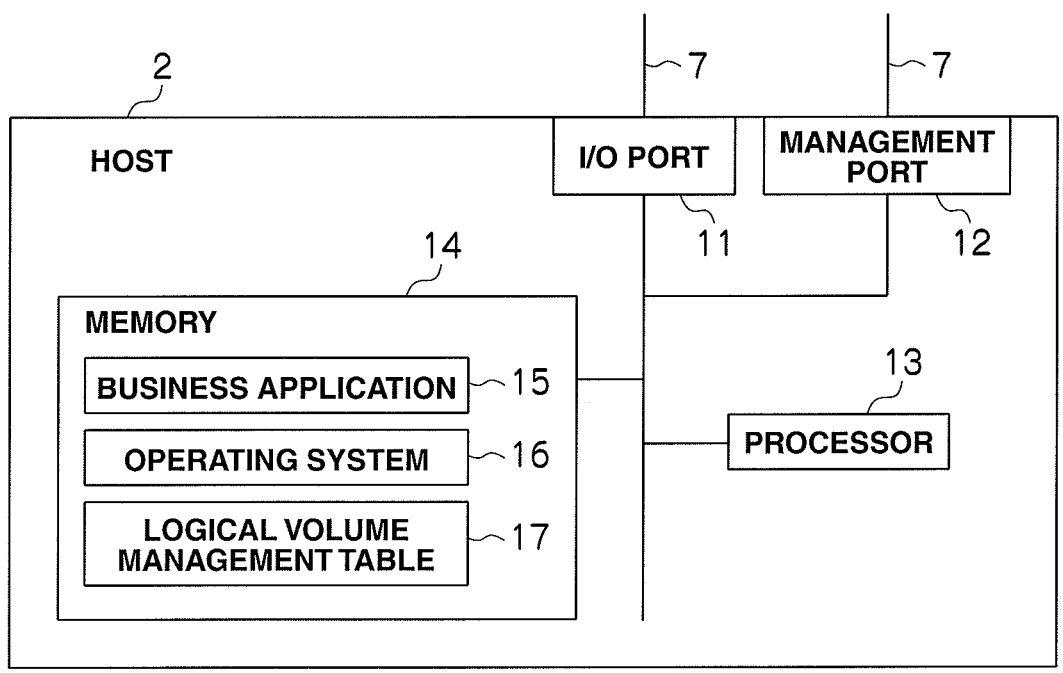
FIG. 2 is a diagram showing a detailed configuration example of a host computer according to the present invention.

FIG. 2 shows a detailed configuration of the host computer 2. The host computer 2 includes an I/O port 11 for connecting to the storage apparatus 3 and the iSNS server 6 via the network 7, a management port 12 for connecting to the management server 4 via the network 7, a processor 13, and a memory 14, and these components are mutually connected via a circuit such as an internal bus. The memory 14 stores a business application 15, an operating system 16, and a logical volume management table 17.

The business application 15 uses a storage area provided by the operating system and inputs and outputs data (hereinafter indicated as "I/O") to and from the storage area. The operating system 16 causes the application to recognize a logical volume in a storage apparatus, which is connected to a host computer via a storage network, as a storage area.

Figure 3:
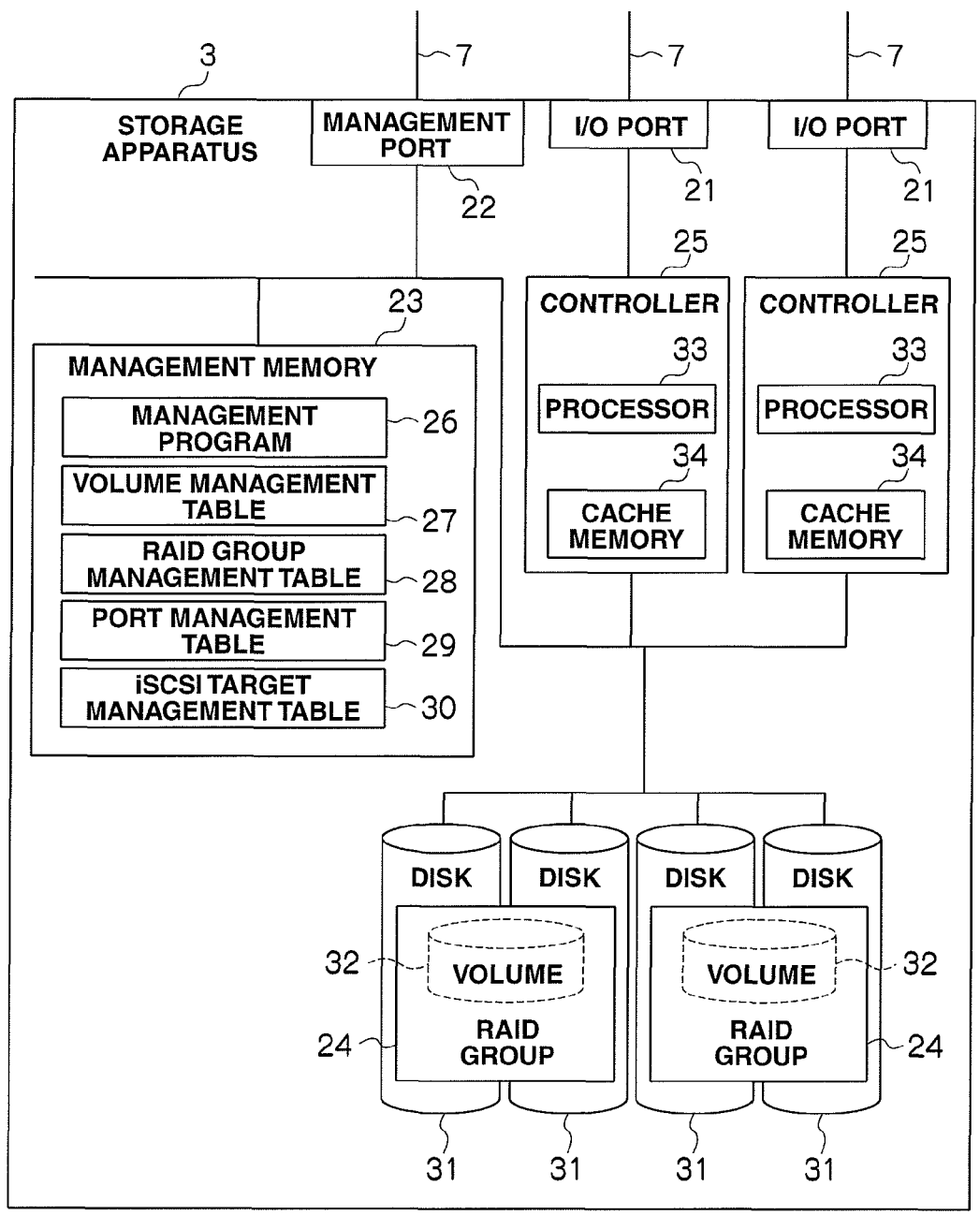
FIG. 3 is a diagram showing a detailed configuration example of a storage apparatus according to the present invention.

FIG. 3 shows a detailed configuration example of the storage apparatus 3. The storage apparatus 3 includes an I/O port 21 for connecting to the host computer 2 and the ISNS server 6 via the network 7, a management port 22 for connecting to the management server 4 and the storage management server 5 via the network 7, a management memory 23 for storing various types of management information, a RAID (Redundant Arrays of Inexpensive Disks) group 24 for storing data, and a controller 25 for controlling data and the management information in the management memory, and these components are mutually connected via a circuit such as an internal bus.

The management memory 23 stores a management program 26 of the storage apparatus 3, a volume management table 27, a RAID group management table 28, a port management table 29, and an iSCSI (Internet Small Computer System Interface) target management table 30.

The RAID group 24 is configured from one or more magnetic disks 31. If the RAID group 24 is configured from a plurality of magnetic disks 31, these magnetic disks may be configured in RAID format. Moreover, the RAID group 24 is logically partitioned into a plurality of volumes 32.

The controller 25 internally possesses a processor 33 for performing control in the storage apparatus 3 and a cache memory 34 for temporarily storing data to be sent to and received from the host computer 2. The controller 25 is interposed between the I/O port 21 and the magnetic disk 31 (RAID group 24), and transfers data between the two.

Figure 4:
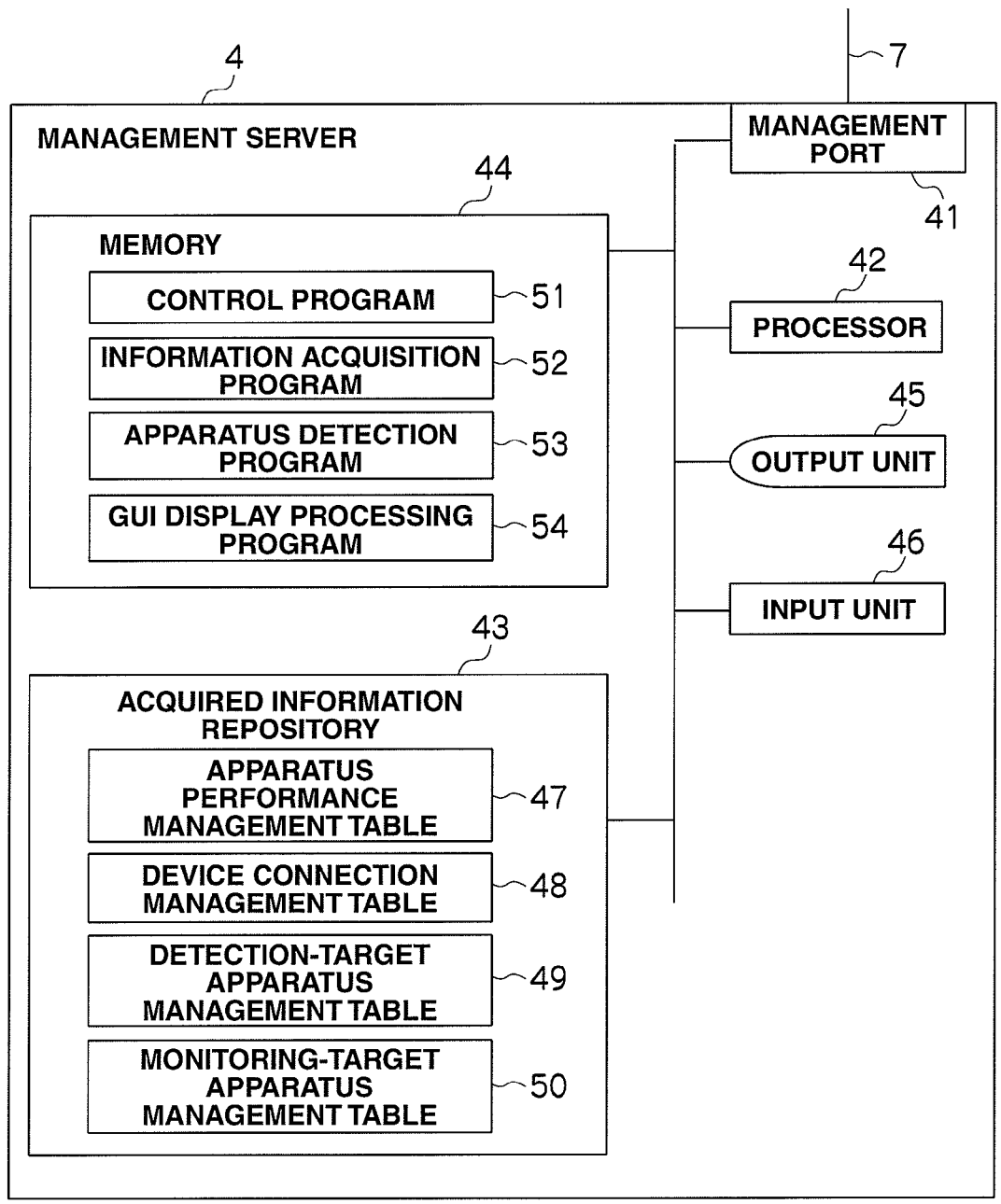
FIG. 4 is a diagram showing a detailed configuration example of a management server according to the present invention.

FIG. 4 shows a detailed configuration of the management server 4. The management server 4 includes a management port 41 for connecting to the host computer 2, the storage apparatus 3 and the iSNS server 6 via the network 7, a processor 42, an acquired information repository 43, a memory 44, an output unit 45 such as a display device for outputting processing results described later, and an input unit 46 such as a keyboard for the storage administrator to input commands, and these components are mutually connected via a circuit such as an internal bus.

The acquired information repository 43 stores an apparatus performance management table 47, a device connection management table 48, a detection-target apparatus management table 49, and a monitoring-target apparatus management table 50.

The acquired information repository 43 stores configuration acquired from the respective monitoring-target apparatuses such as the volume management table 27 in the storage apparatus 3.

The apparatus performance management table 47 stores the performance information of devices configuring the monitoring-target apparatus and the threshold values assigned to the devices.

The memory 44 stores a control program 51, an information acquisition program 52, an apparatus detection program 53, and a GUI (Graphical User Interface) display processing program 54.

The control program 51 commands the information acquisition program 52 to periodically acquire configuration information and performance information from the host computer 2 and the storage apparatus 3 in the computer system 1. The control program 51 also commands the apparatus detection program 53 to periodically detect a host computer 2 and a storage apparatus 3 added to the computer system 1.

The information acquisition program 52 acquires configuration information and performance information from the host computer 2 and the storage apparatus 3, and stores such information in the apparatus performance management table 47 and the device connection management table 48.

The apparatus detection program 53 detects (searches) the host computer 2 and the storage apparatus 3 connected to the network 7 and, if a host computer 2 and a storage apparatus 3 newly connected to the network 7 are detected, commands the information acquisition program 52 to acquire configuration information and performance information from the corresponding host computer 2 and the storage apparatus 3.

The GUI display processing program 54, in response to a request from the administrator via the input unit 46, displays the acquired configuration information and performance information via the output unit 45.

Figure 5:
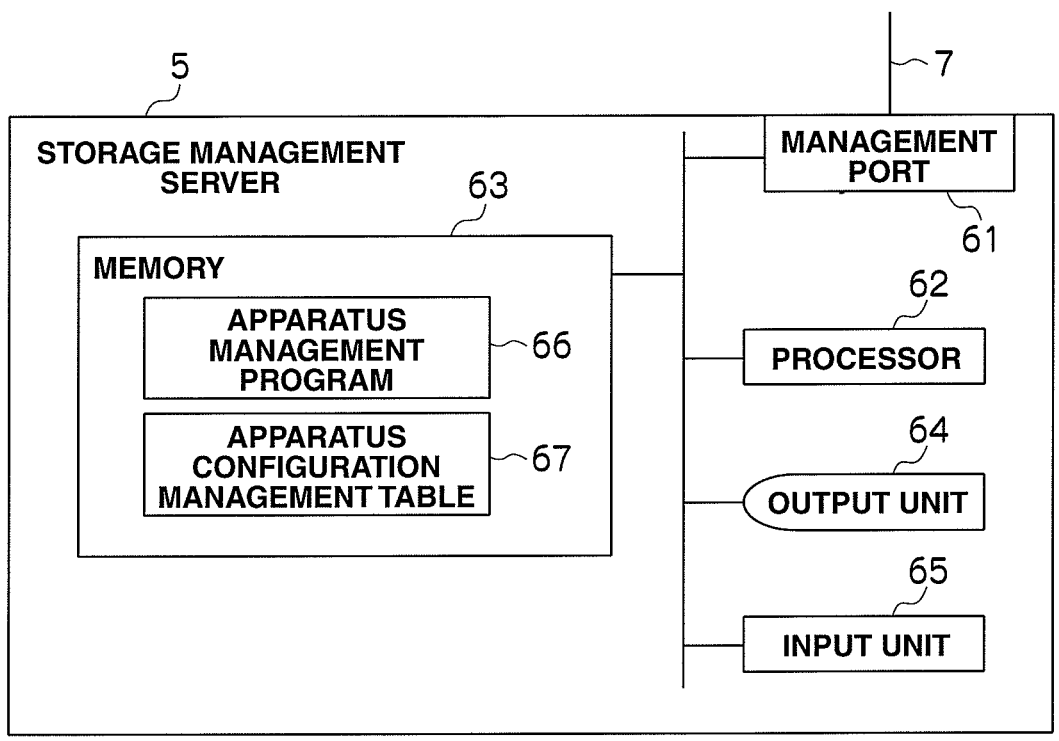
FIG. 5 is a diagram showing a detailed configuration example of a storage management server according to the present invention.

FIG. 5 shows a detailed configuration of the storage management server 5. The storage management server 5 includes a management port 61 for connecting to the storage apparatus 3 via the network 7, a processor 62, a memory 63, an output unit 64 such as a display device for outputting processing results described later, and an input unit 65 such as a keyboard for the storage administrator to input commands, and these components are mutually connected via a circuit such as an internal bus.

The memory 63 stores an apparatus management program 66 and an apparatus configuration management table 67. The apparatus management program 66 acquires configuration information from the storage apparatus 3 in response to a request from the administrator, and displays this to the user via the output unit 45. The apparatus management program 66 stores the acquired configuration information in the apparatus configuration management table 67.

Figures 6, 7:
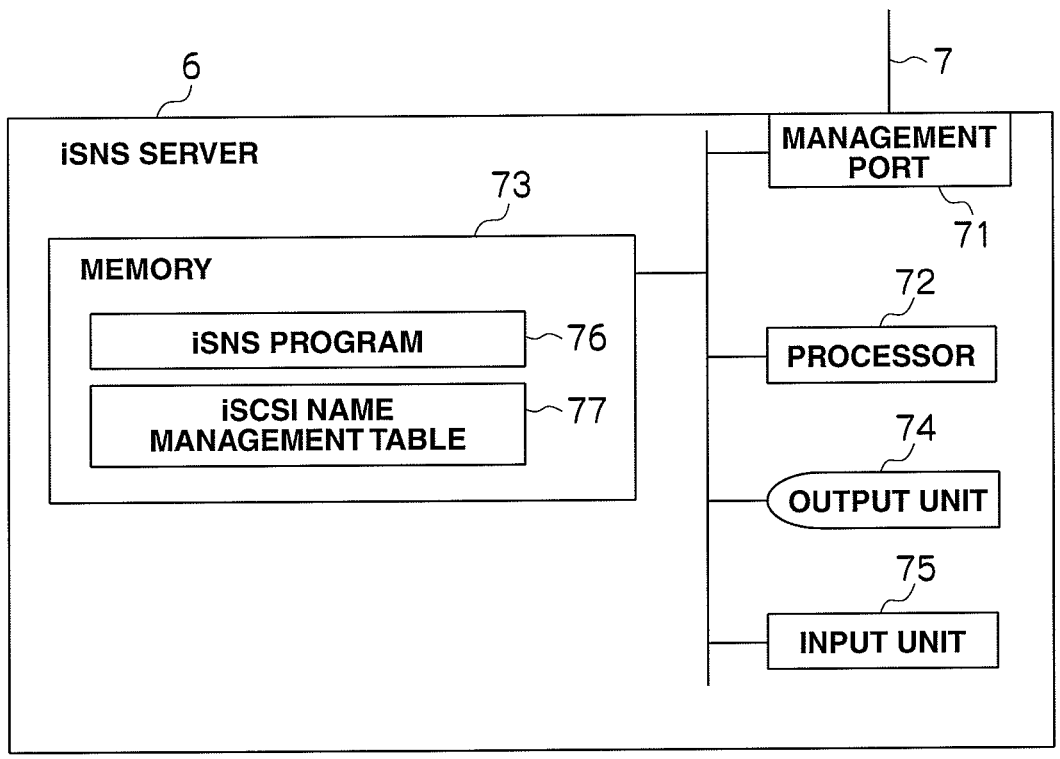
FIG. 6 is a diagram showing a detailed configuration example of an iSNS server according to the present invention.
FIG. 7 is a diagram showing a configuration example of a logical volume management table stored in the host computer according to the present invention.

FIG. 6 shows a detailed configuration of the iSNS server 6. The iSNS server 6 includes a management port 71 for connecting to the host computer 2, the storage apparatus 3 and the iSNS server 6 via the network 7, a processor 72, a memory 73, an output unit 74 such as a display device for outputting processing results described later, and an input unit 75 such as a keyboard for the storage administrator to input commands, and these components are mutually connected via a circuit such as an internal bus.

The memory 73 stores an iSNS program 76 and an iSCSI name management table 77.

The iSNS program 76 stores information of the IP-SAN appliance on the network 7 in the iSCSI name management table 77, and returns an IP address corresponding to the iSCSI name stored in the iSCSI name management table 77 according to a request from the IP-SAN appliance.

FIG. 7 shows a configuration of the logical volume management table 17 stored in the host computer 2. The logical volume management table 17 is configured from a field 17A for registering a logical volume ID to become the identifier of the respective logical volumes in the host computer 2, a field 17B for registering an iSCSI initiator name to become the identifier of the I/O port 11 in the host computer 2 to be used upon communicating with the storage apparatus 3 in which the substance of the logical volume exists, a field 17C for registering a destination iSCSI target to become the identifier of the I/O port 21 in the storage apparatus 3 to be used upon communicating with the storage apparatus 3 in which the substance of the logical volume exists, and a field 17D for registering a LUN ID to become the identifier of the logical volume in the storage apparatus 3.

FIG. 7 shows an example of the specific values of the logical volume management table 17 stored in the host computer 2. Specifically, the logical volume in the host computer 2 indicated as a "E:" is connected to the storage apparatus 3 via the I/O port 11 in the host computer 2 shown with the iSCSI initiator name of "com.hitachi.sv1", and the I/O port 21 in the storage apparatus 3 shown with the iSCSI target name of "com.hitachi.sto1," and has a LUN ID of the logical volume of "0" in the storage apparatus 3.

FIG. 8 shows a configuration of the volume management table 27 stored in the storage apparatus 3. The volume management table 27 is configured from a field 27A for registering a volume ID to become the identifier of the respective volumes 32 in the storage apparatus 3, a field 27B for registering the capacity of the respective volumes 32, a field 27C for registering a RAID group ID to become the identifier of the RAID group 24 in which the respective volumes 32 exist, a field 27D for registering a target ID to become the identifier of the iSCSI target under the control of the I/O port 21, a field 27E for registering a LUN ID to become the identifier of the logical volume of the host computer in the storage apparatus 3, and a new addition flag 27F to be used in the added component detection processing to be performed by the control program 51.

FIG. 8 shows an example of the specific values of the volume management table 27 stored in the storage apparatus 3. In other words, the volume 32 indicated as "VOL1" in the storage apparatus 3 is configured from a storage area of "20GB" in the RAID group 24 shown with the RAID group ID of "RG1," has an iSCSI target shown with the target ID of "TG1" under its control, and has a LUN ID of the logical volume of "0."

FIG. 9 shows a configuration of the RAID group management table 28 stored in the storage apparatus 3. The RAID group management table 28 is configured from a field 28A for registering a RAID group ID to become the identifier of the respective RAID groups 24 in the storage apparatus 3, a field 28B for registering the RAID level of the RAID group 24, a field 28C for registering a configuration disk ID to become the identifier of the magnetic disks 31 configuring the RAID group 24, and a field 28D for registering the capacity of the respective RAID groups 24.

FIG. 9 shows an example of the specific values of the RAID group management table 28 stored in the storage apparatus 3. Specifically, The RAID group 24 of "RG1" in the storage apparatus 3 is configured from the magnetic disks 31 shown with the configuration disk ID of "DISK1, DISK2," the RAID level is "RAID1" and the capacity is "100GB."

FIG. 10 shows a configuration of the port management table 29 stored in the storage apparatus 3. The port management table 29 is configured from a field 29A for registering a port ID to become the identifier of the respective I/O ports 21 in the storage apparatus 3, and a field 29B for registering a target ID to become the identifier of the iSCSI target under the control of the I/O port 21.

FIG. 10 shows an example of the specific values of the port management table 29 stored in the storage apparatus 3. Specifically, "PORT1" as the I/O port 21 in the storage apparatus 3 has iSCSI targets shown with the target ID of "TG1" and "TG2" under its control.

FIG. 11 shows a configuration of the iSCSI target management table 30 stored in the storage apparatus 3. The iSCSI target management table 30 is configured from a field 30A for registering a target ID to become the identifier of the ISCSI targets in the storage apparatus 3, a field 30B for registering the iSCSI target name of the respective iSCSI targets, and a field 30C for registering the iSCSI initiator name to become the identifier of the I/O port 11 in the host computer 2 permitted access to the volumes 32 belonging to the respective iSCSI targets.

FIG. 11 shows an example of the specific values of the iSCSI target management table 30 stored in the storage apparatus 3. Specifically, "TG1" as the iSCSI target in the storage apparatus 3 has an iSCSI target name of "com.hitachi.sto1," and is permitting access from the I/O port 11 in the host computer having an iSCSI initiator name of "com.hitachi.sv1" or "com.hitachi.sv11."

FIG. 12 shows a configuration of the apparatus performance management table 47 stored in the management server 4. The apparatus performance management table 47 is configured from a field 47A for registering an apparatus ID to become the identifier of the storage apparatus 3 to which the device to be managed (management-target device) belongs, a field 47B for registering a device ID as the identifier of the management-target device, a field 47C for storing a metric name of the performance information of the management-target device, a field 47D for acquiring the performance value (IOPS (Input Output Per Second)) of the management-target device from the storage apparatus 3 and storing such performance value, and a field 47E for storing a threshold value to be used in executing an alert.

The management server 4 notifies an alert to the user by way of email or other means, for instance, when the I/O amount per unit time of the management-target device exceeds a prescribed threshold value.

FIG. 12 shows an example of the specific values of the apparatus performance management table 47 stored in the management server 4. In other words, the I/O amount per unit time of "RG2" as the RAID group 24 in "SYS1" as the storage apparatus 3 is currently "200." If the I/O amount per unit time of "RG2" exceeds "500," the management server 4 notifies an alert to the user.

Although the I/O amount per unit time and operating ratio were explained as the performance value of the management-target device being managed by the management server 4, the performance value to be managed by the management server 4 may be other values.

FIG. 13 shows a configuration of the device connection management table 48 stored in the management server 4. The device connection management table 48 is configured from a field 48A for registering an apparatus ID to become the identifier of the storage apparatus 3, a field 48B for registering a volume ID to become the identifier of the volumes 32 stored in the storage apparatus 3, a field 48C for registering the identifier of the I/O port 11 to be used by the volume 32 in communicating with the host computer 2, a field 48D for registering the identifier of the RAID group 24 to which the volume 32 belongs, a field 48E for registering the identifier of the host computer 2 to which the volume 32 is connected, and a field 48F for registering the name of the drive of the host computer 2 as the substance of the volume 32.

FIG. 13 shows an example of the specific values of the device connection management table 48 stored in the management server 4. Specifically, "VOL1" as the volume 32 of "SYS1" as the storage apparatus 3 belongs the "RG1" as the RAID group 24, is connected to "HOST1" as the host computer 2 via "PORT1" as the I/O port 11, and the destination drive is recognized as "E:" in the host computer 2.

FIG. 14 shows a configuration of the detection-target apparatus management table 49 stored in the management server 4. The detection-target apparatus management table 49 is configured from a field 49A for registering a detection-target address to be accessed by the apparatus detection program 53, a field 49B for registering a user name to be used upon accessing appliances existing at the detection-target address, and a field 49C for registering a password to be used together with the user name.

FIG. 14 shows an example of the specific values of the detection-target apparatus management table 49 stored in the management server 4. Specifically, the apparatus detection program 53 stored in the management server 4 accesses the appliances in which the IP address is within the range of "192.168.5.1" to "192.168.5.255," and confirms whether new equipment has been added. Here, the apparatus detection program 53 uses "user" as the user name and "pwd" as the password.

FIG. 15 shows a configuration of the monitoring-target apparatus management table 50 loaded in the management server 4. The monitoring-target apparatus management table 50 is configured from a field 50A for registering a network address of the host computer 2 or the storage apparatus 3 detected by the apparatus detection program 53, a field 50B for registering whether the appliance existing at the network address is the host computer 2 or the storage apparatus 3, a field 50C for registering a user name to be used upon accessing the appliance existing at the network address, and a field 50D for registering a password to be used together with the user name.

FIG. 15 shows an example of the specific values of the monitoring-target apparatus management table 50 loaded in the management server 4. Specifically, the information acquisition program 52 stored in the management server 4 accesses the host computer 2 located at the IP address of "192.168.5.5" and acquires information. Here, the information acquisition program 52 uses "user" as the user name and "pwd" as the password.

FIG. 16 shows the configuration of the iSCSI name management table 77 stored in the iSNS server 6. The iSCSI name management table 77 is configured from a field 77A for registering an iSCSI name as the identifier of the iSCSI initiator and the iSCSI target, a field 77B for registering a corresponding IP address, and a field 77C for registering in advance regarding whether it is an iSCSI initiator or an iSCSI target.

FIG. 16 shows an example of the specific values of the iSCSI name management table 77 stored in the iSNS server 6. Specifically, the iSCSI initiator of the apparatus located at an IP address of "192.168.5.2" has an iSCSI name of "com.hitachi.sv1."

FIG. 17 shows a threshold exceedance warning screen 81 as a display example of the resources in the storage apparatus 3 subject to performance issues and a report narrowing down only on the configuration information of the host computer 2 using those resources to be displayed by the management server 4 to the system administrator.

The threshold exceedance warning screen 81 displays the detailed information (table 81A) of the resources in the storage apparatus 3 subject to performance issues and the detailed information (table 81B) narrowing down only on the host computer 2 using those resources.

Figure 18:
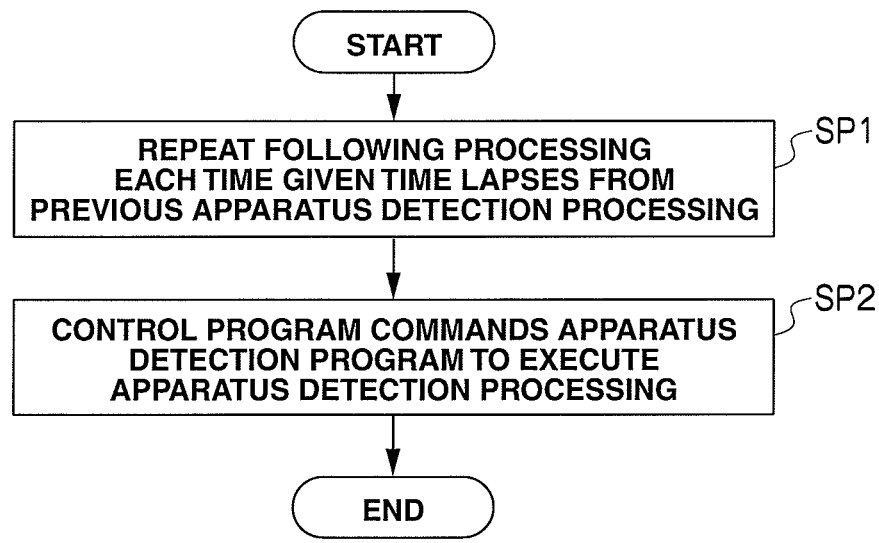
FIG. 18 is a flowchart showing an overall flow example of the apparatus information update processing to be implemented by the management server in the first embodiment.

FIG. 18 shows a flowchart of the apparatus detection processing to be implemented by the control program 51 of the management server 4 in the present embodiment. The control program 51, when the program is booted or each time a given time lapses from the previous apparatus detection processing (step SP1), repeats the processing of commanding the apparatus detection program 53 to execute the apparatus detection processing (step SP2).

Figure 19:
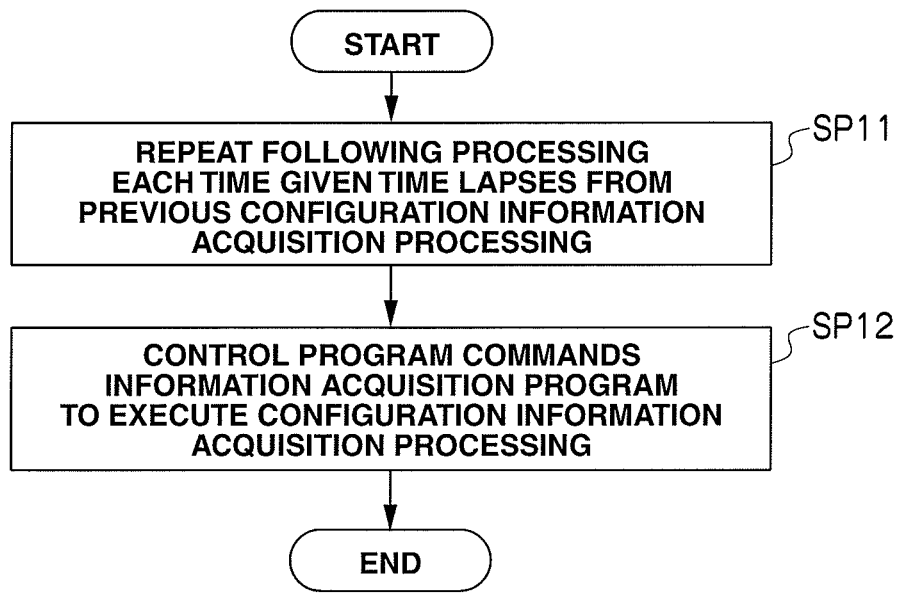
FIG. 19 is a flowchart showing an overall flow example of the configuration information update processing to be implemented by the management server in the first embodiment.

FIG. 19 shows a flowchart of the configuration information acquisition processing to be implemented by the control program 51 of the management server 4 in the present embodiment. The control program 51, when the program is booted or each time a given time lapses from the previous configuration information acquisition processing (step SP11), repeats the processing of commanding the information acquisition program 52 to execute the configuration information acquisition processing (step SP12).

Figure 20:
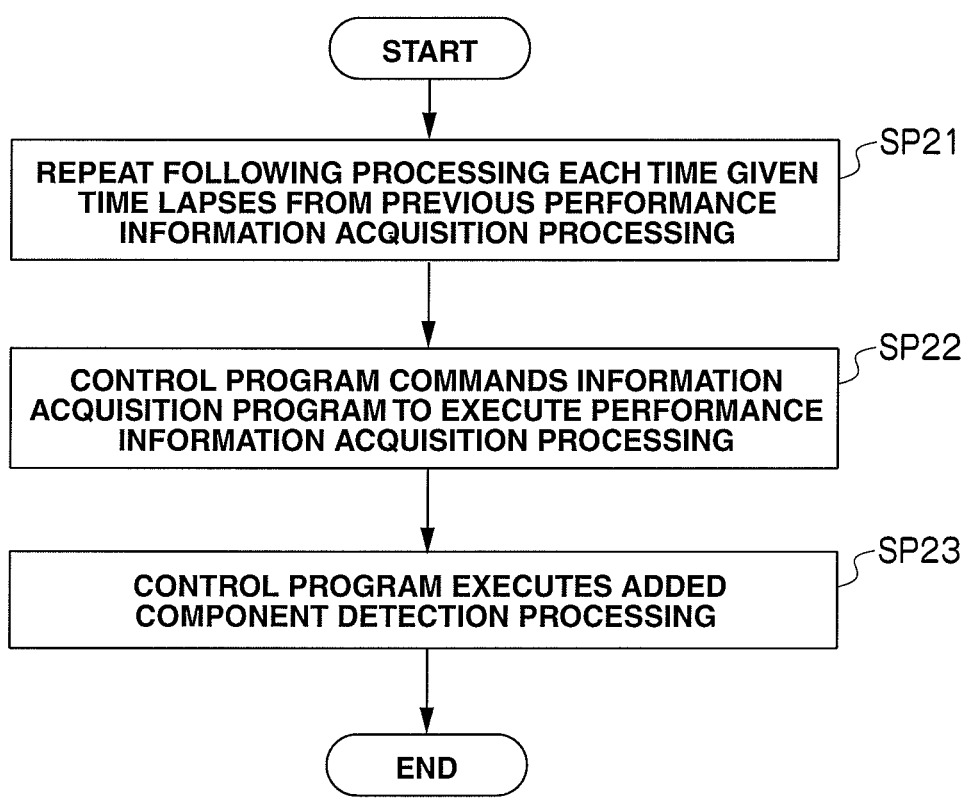
FIG. 20 is a flowchart showing an overall flow example of the performance information update processing to be implemented by the management server in the first embodiment.

FIG. 20 shows a flowchart of the performance information acquisition processing to be implemented by the control program 51 of the management server 4 in the present embodiment. The control program 51, when the program is booted or each time a given time lapses from the previous performance information acquisition processing (step SP21), repeats the following sequential processing. Specifically, the control program 51 commands the information acquisition program 52 to execute the performance information acquisition processing (step SP22). Subsequently, the control program 51 executes the added component detection processing (step SP23).

Figure 21:
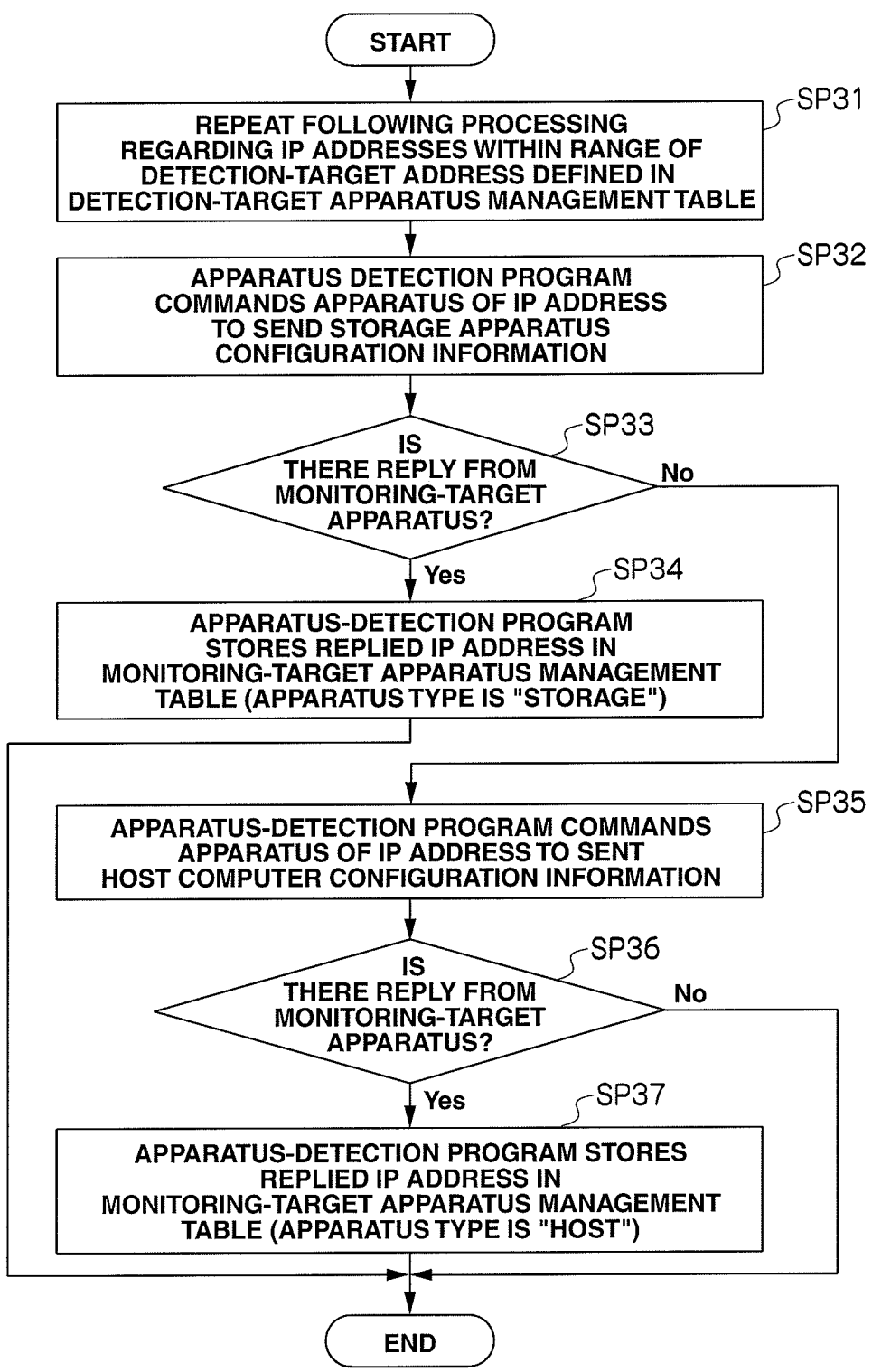
FIG. 21 is a flowchart showing an overall flow example of the apparatus detection processing to be implemented by the management server in the first embodiment.

FIG. 21 shows a flowchart of the apparatus detection processing to be implemented by the apparatus detection program 53 of the management server 4 according to the present embodiment. The apparatus detection program 53 repeats the following sequential processing regarding the IP addresses within the detection-target address defined in the detection-target apparatus management table 49 (step SP31).

The apparatus detection program 53 logs into the apparatus located at the IP address defined in the detection-target apparatus management table 49 using the user name and password defined in this table, and commands that apparatus to send the storage apparatus configuration information (step SP32). The configuration information to be acquired may be arbitrary information.

Subsequently, the apparatus detection program 53 determines whether there was a reply of the storage apparatus configuration information from the apparatus located at the IP address defined in the detection-target apparatus management table 49 (step SP33).

If there was a reply of the storage apparatus configuration information from that apparatus (step SP33: YES), the apparatus detection program 53 determines that the apparatus is the storage apparatus 3, stores the replied IP address in the monitoring-target apparatus management table 50 (step SP34), and proceeds to the processing to be performed to the subsequent IP address (step SP31 to SP37). Here, the apparatus detection program 53 registers "storage" as the apparatus type and, as the user name and password, uses the user name and password that were used upon sending the configuration information send request to the storage apparatus 3.

If there was no reply of the storage apparatus configuration information from that apparatus, the apparatus detection program 53 logs into an apparatus located at the IP address defined in the detection-target apparatus management table 49 using the user name and password defined in this table, and commands that apparatus to send the host computer configuration information (step SP35). The configuration information to be acquired may be arbitrary information.

Subsequently, the apparatus detection program 53 determines whether there was a reply of the host computer configuration information from the address located at the IP address defined in the detection-target apparatus management table 49 (step SP36).

If there was a reply of the host computer configuration information from that apparatus (step SP36: YES), the apparatus detection program 53 determines that the apparatus is the host computer 2, stores the replied IP address in the monitoring-target apparatus management table 50 (step SP37), and proceeds to the processing to be performed to the subsequent IP address (step SP31 to SP37). Here, the apparatus detection program 53 registers "host" as the apparatus type and, as the user name and password, uses the user name and password that were used upon sending the configuration information send request to the host computer 2.

If there was no reply of the host computer configuration information from that apparatus (step SP36: NO), the apparatus detection program 53 proceeds to the processing to be performed to the subsequent IP address (step SP31 to SP37).

Figure 22:
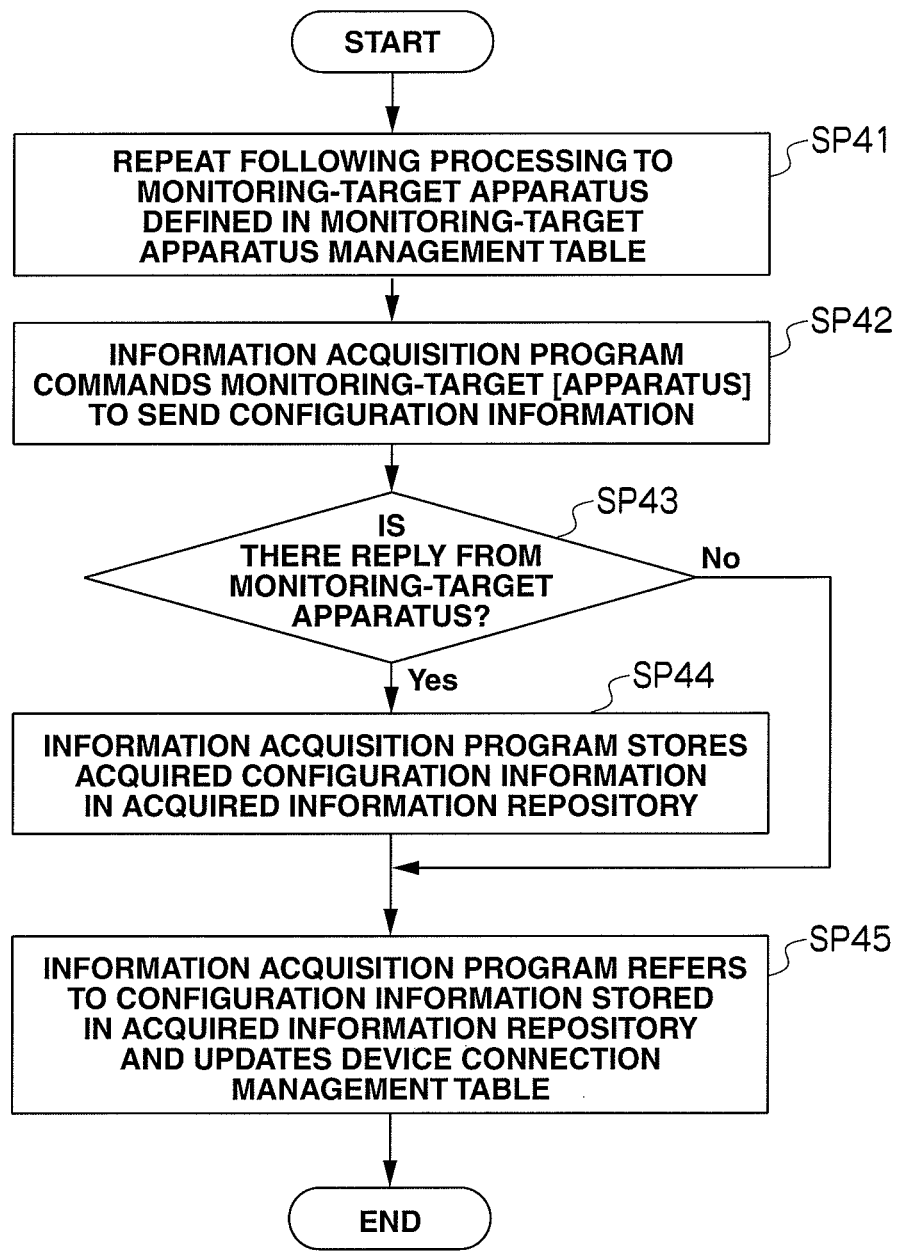
FIG. 22 is a flowchart showing an overall flow example of the configuration information acquisition processing to be implemented by the management server in the first embodiment.

FIG. 22 shows a flowchart of the configuration information acquisition processing to be implemented by the information acquisition program 52 of the management server 4 according to the present embodiment. The information acquisition program 52 repeats the following sequential processing regarding the respective monitoring-target apparatuses defined in the detection-target apparatus management table 49 (step SP41).

The information acquisition program 52 logs into the apparatus located at the IP address defined in the detection-target apparatus management table 49 using the user name and password defined in this table, and commands that apparatus to send the configuration information (step SP42).

Here, the information acquisition program 52 confirms the apparatus type of each IP address and, if the apparatus type is the host computer 2, acquires the information of the logical volume management table 17 as the configuration information. If the apparatus type is the storage apparatus 3, the information acquisition program 52 acquires information of the volume management table 27, the RAID group management table 28, the port management table 29, and the iSCSI target management table 30 as the configuration information.

Subsequently, the information acquisition program 52 determines whether there was a reply of the configuration information from the apparatus located at the IP address defined in the detection-target apparatus management table 49 (step SP43).

If there was a reply of the configuration information from that apparatus (step SP43: YES), the information acquisition program 52 stores the acquired configuration information in the acquired information repository 43 (step SP44).

If there was no reply of the configuration information from that apparatus (step SP43: NO), the information acquisition program 52 proceeds to the processing to be performed to the subsequent monitoring-target apparatus (step SP41 to SP44).

After completing the processing to all monitoring-target apparatuses defined in the detection-target apparatus management table 49, the information acquisition program 52 refers to the configuration information stored in the acquired information repository 43, and updates the device connection management table 48 (step SP45).

The routine for updating the device connection management table 48 is explained below. Foremost, the information acquisition program 52 refers to the volume management table 27 stored in the acquired information repository 43, confirms the RAID group 24 in a connection relationship with the volume 32 and stores this in the device connection management table 48. Subsequently, the information acquisition program 52 refers to the port management table 29, confirms the relationship of the volume 32 and the iSCSI target and the I/O port 21, confirms the I/O port 21 in a connection relationship with the volume 32, and registers this in the device connection management table 48. Subsequently, the information acquisition program 52 refers to the iSCSI target management table 30 and the logical volume management table 17, and confirms the relationship of the volume 32 and the iSCSI target, and the relationship of the drive and destination iSCSI target of the host computer 2. When the information acquisition program 52 detects a pair of the volume 32 and drive having the same iSCSI target and with an identical LUN ID, it registers this pair as having a mutual connection relationship in the device connection management table 48.

Figure 23:
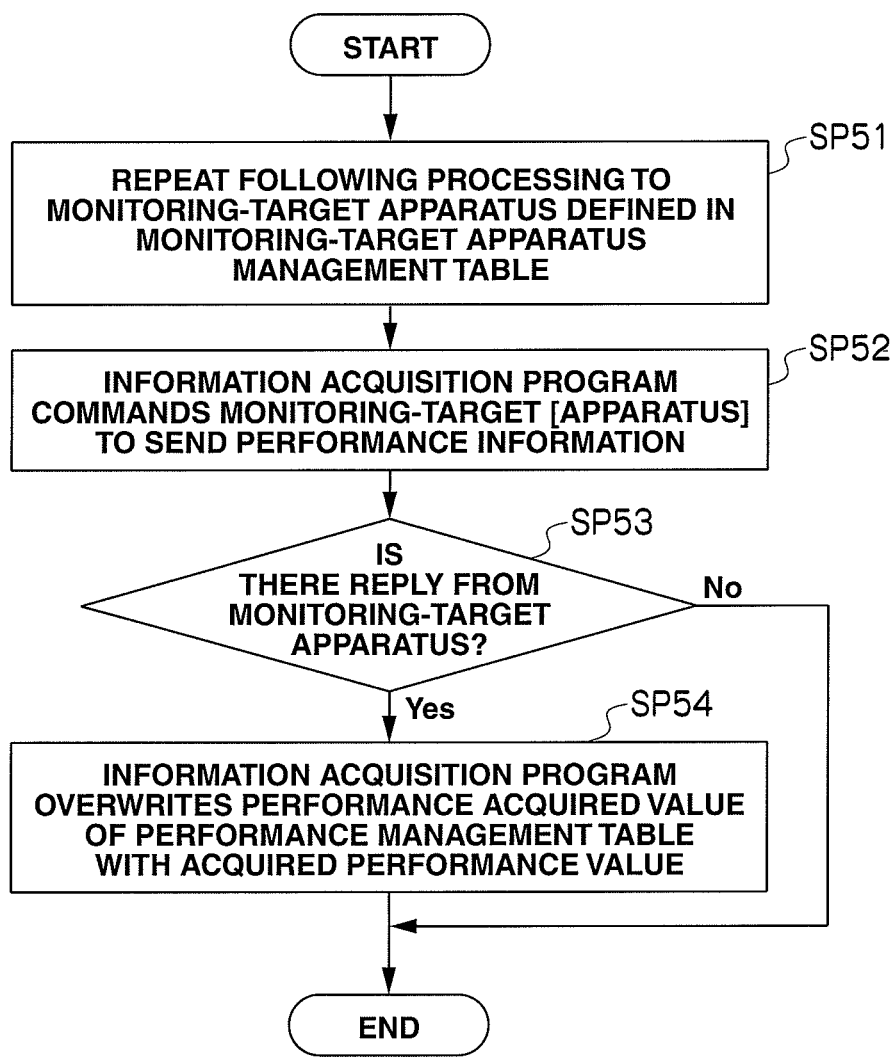
FIG. 23 is a flowchart showing an overall flow example of the performance information acquisition processing to be implemented by the management server in the first embodiment.

FIG. 23 shows a flowchart of the performance information acquisition processing to be implemented by the information acquisition program 52 of the management server 4 according to the present embodiment.

The information acquisition program 52 repeats the following sequential processing regarding the respective monitoring-target apparatuses defined in the detection-target apparatus management table 49 (step SP51).

The information acquisition program 52 uses the user name and password defined in the monitoring-target apparatus management table 48 and commands an apparatus located at the IP address to send the performance information (step SP52).

Subsequently, the information acquisition program 52 determines whether there was a reply of the performance information from the apparatus located at the IP address defined in the detection-target apparatus management table 49 (step SP53).

If there was a reply of the performance information from that apparatus (step SP53: YES), the information acquisition program 52 stores the acquired performance information in the apparatus performance management table 47 (step SP54).

If there was no reply of the performance information from that apparatus (step SP53: NO), the information acquisition program 52 proceeds to the processing to be performed to the subsequent monitoring-target apparatus (step SP51 to SP54).

Figure 24:
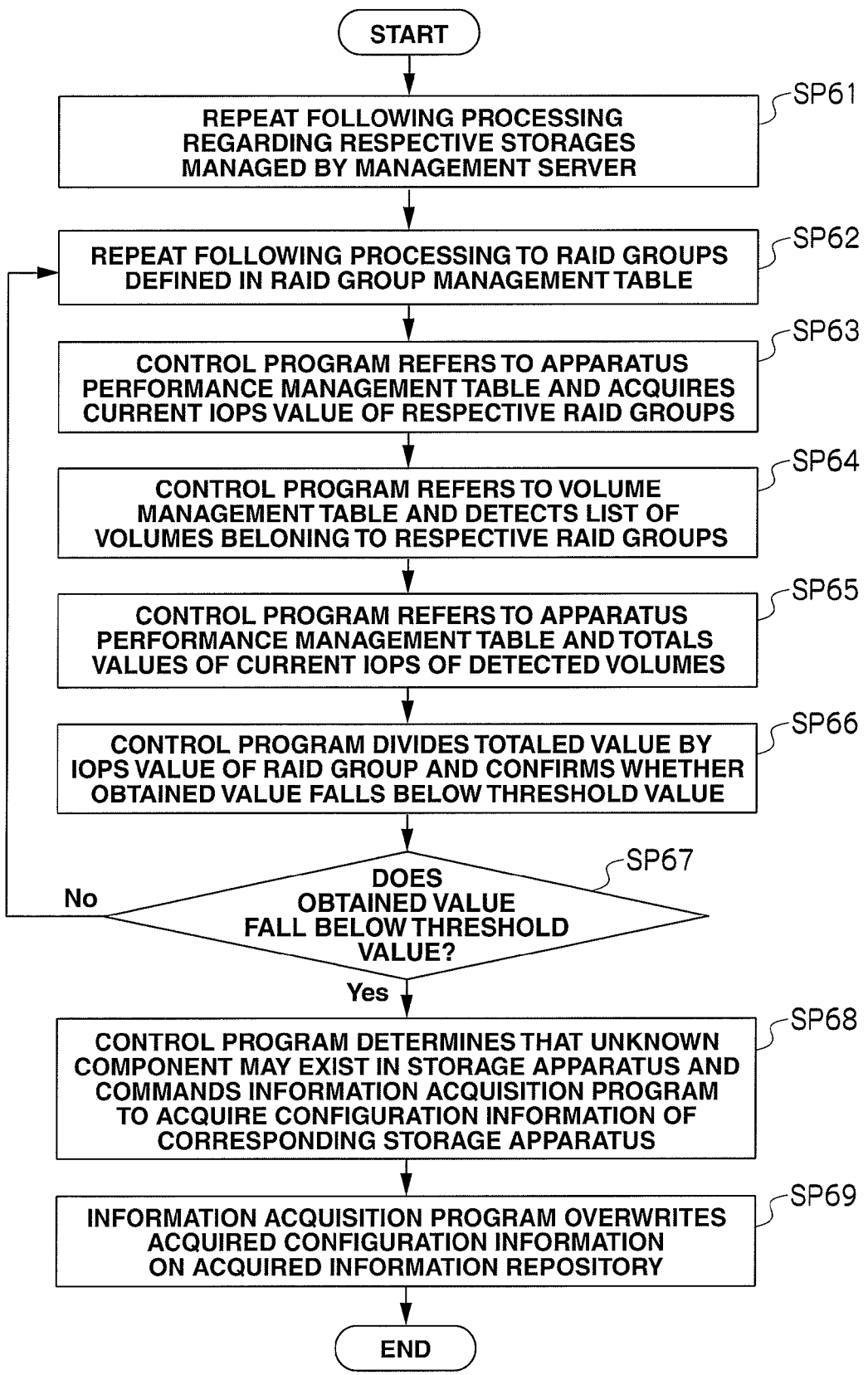
FIG. 24 is a flowchart showing an overall flow example of the added component detection processing to be implemented by the management server in the first embodiment.

FIG. 24 shows a flowchart of the added component detection processing to be implemented by the control program 51 of the management server 4 according to the present embodiment. When the control program 51 implements a configuration change of the storage apparatus 3 via the storage management server 5, it repeats the following processing regarding the respective storage apparatuses 3 being managed by the management server 4 (step SP61). The control program 51 repeats the following processing to the RAID groups 24 in the storage apparatuses 3 defined in the RAID group management table 28 (step SP62).

The control program 51 refers to the apparatus performance management table 47, and acquires the value of the current IOPS of the respective RAID groups 24 (step SP63). Subsequently, the control program 51 refers to the volume management table 27, and detects a list of the volumes 32 belonging to the respective RAID groups 24 (step SP64). Subsequently, the control program 51 refers to the apparatus performance management table 47, and totals the values of the current IOPS of the detected volumes 32 (step SP65). The control program 51 thereafter divides the totaled value by the IOPS value of the RAID group 24, and confirms whether the obtained value exceeds a predetermined threshold value (step SP66).

Subsequently, the control program 51 determines whether the value obtained by dividing the totaled value by the IOPS value of the RAID group 24 exceeds a predetermined threshold value (step SP67).

If the obtained value does not exceed the threshold value (step SP67: NO), the control program 51 proceeds to the processing to be performed to the subsequent RAID group 24 (step SP62 to SP67). If the obtained value exceeds the threshold value (step SP67: YES), the control program 51 determines that there is an unknown component in the storage apparatus 3, and commands the information acquisition program 52 to acquire the configuration information of the storage apparatus 3 in which the corresponding RAID group 24 exists (step SP68). Here, the control program 51 acquires the information of the volume management table 27, the RAID group management table 28, the port management table 29, and the iSCSI target management table 30 as the configuration information from the storage apparatus 3.

Subsequently, the information acquisition program 52 overwrites the acquired configuration information on the acquired information repository 43 (step SP69), and then ends the processing.

A specific example on the method of calculating the values shown in steps SP61 to SP66 is shown below. According to the volume management table 27 of FIG. 8, the volumes 32 connected to "RG1" as the RAID group 24 are the four volumes of "VOL1, VOL2, VOL3, VOL4." According to the apparatus performance management table 47 of FIG. 12, the IOPS of "RG1" is "600" and the sum of the IOPS of "VOL1, VOL2, VOL3, VOL4" is "130." Thus, when the total value of the IOPS of the volumes 32 is divided by the IOPS value of the RAID group 24, "130/600≈0.22." If the predetermined threshold value is "0.8," the calculated value will fall below the threshold value.

Although this embodiment totals the IOPS of the volumes 32 in a connection relationship with the respective RAID groups 24 and compares the totaled value with the IOPS of the RAID group 24, other components (I/O port 21 or the like) in a connection relationship with a plurality of volumes 32 may also be used in the totaling and comparison in substitute for the RAID group 24. Contrarily, in this embodiment, components (magnetic disk 31 or the like) in a many-to-one relationship with the RAID group 24 may also be used in the totaling and comparison in substitute for the volumes 32. Furthermore, although this embodiment used IOPS as the performance value to be totaled and compared, other performance metrics may also be used.

The added component detection processing of the present embodiment is as described above.

With the computer system 1 according to the present embodiment, by implementing the added component detection processing when a configuration change of the storage apparatus 3 is implemented via the storage management server 5, even if it is immediately after the system administrator implements a configuration change of the storage apparatus 3 via the storage management server 5 shown in FIG. 5, the configuration of that storage apparatus 3 can be accurately displayed to the system administrator via the management server 4.

(2) Second Embodiment

The second embodiment of the computer system 2 explains a case where, when the system administrator implements the configuration change of the storage apparatus 3 via the storage management server 5 existing separately from the management server 4, the management server 4 automatically detects the configuration change, and detects and acquires the configuration information of the storage apparatus 3 and the host computer 2 using that storage apparatus 3.

Figure 25:
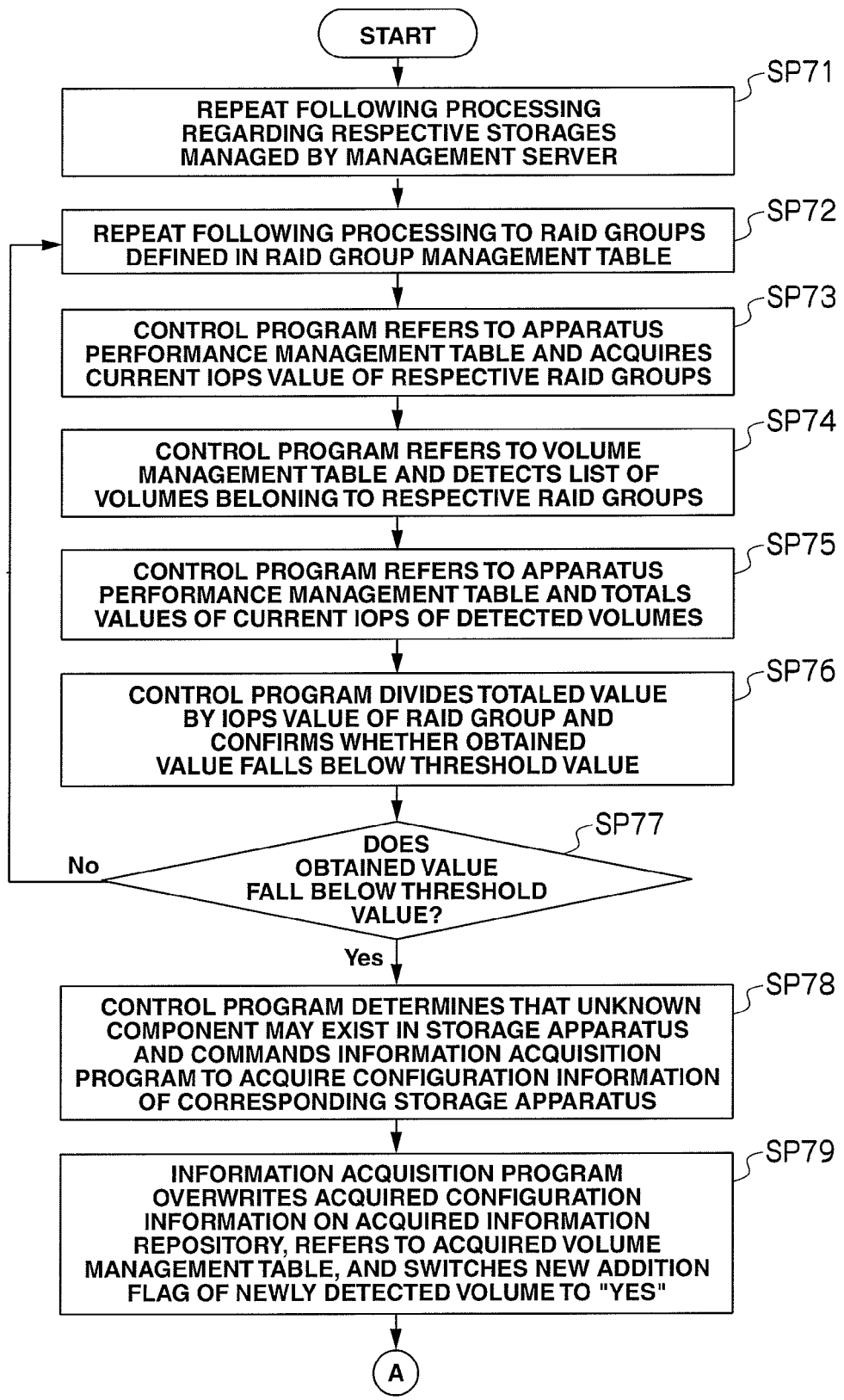
FIG. 25 is a flowchart showing an overall flow example of the added component detection processing to be implemented by the management server in the second embodiment.
Figure 26:
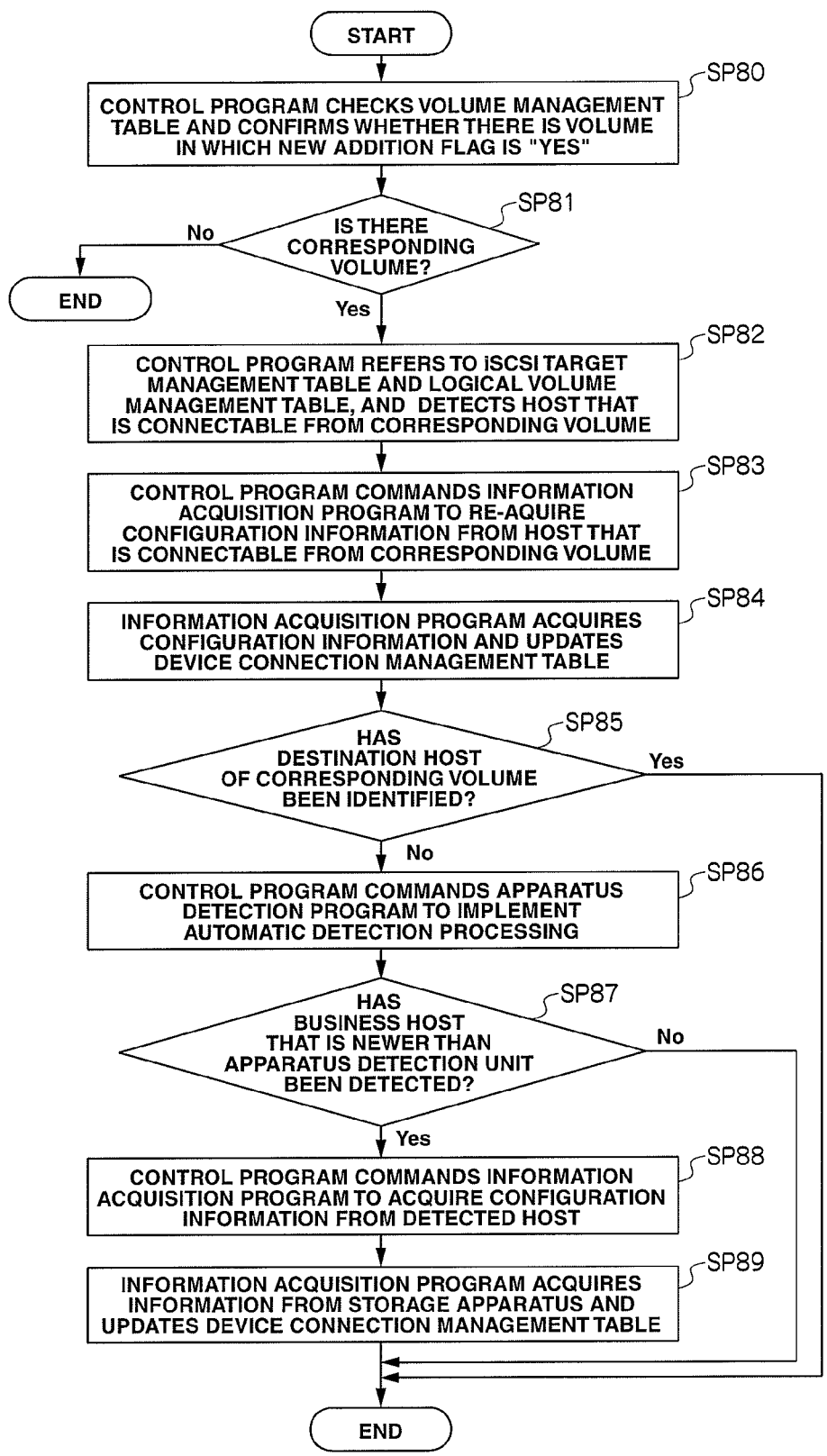
FIG. 26 is a flowchart showing an overall flow example of the added component detection processing to be implemented by the management server in the second embodiment.

FIG. 25 and FIG. 26 show flowcharts of the added component detection processing to be implemented by the control program 51 of the management server 4 according to the present embodiment. Since the processing from step SP71 to step SP78 is the same as step SP61 to step SP68, respectively, of the first embodiment, the explanation thereof is omitted.

The information acquisition program 52 compares the volume management table 27 newly acquired from the storage apparatus 3, and the volume management table 27 before update, and switches the new addition flag of the newly detected volume 32 to "Yes" (step SP79).

After the processing is complete, the control program 51 checks the volume management table 27 and confirms whether there is a volume 32 in which the new addition flag is "Yes" (step SP80; FIG. 26).

Subsequently, the control program 51 determines whether there is a volume 32 in which the new addition flag is "Yes" (step SP81). If there is no corresponding volume 32 (step SP81: NO), the control program 51 ends the processing.

If there is a corresponding volume 32 (step SP81: YES), the control program 51 refers to the iSCSI target management table 30, and detects the iSCSI initiator name that is connectable from the corresponding volume 32. Subsequently, the control program 51 refers to the logical volume management table 17, and detects the host computer 2 having that iSCSI initiator name (step SP82).

Subsequently, the control program 51 commands the information acquisition program 52 to reacquire the configuration information from the host computer 2 that is connectable from the corresponding volume 32 (step SP83). The information acquisition program 52 acquires the configuration information, overwrites the acquired configuration information on the acquired information repository 43, and updates the device connection management table 48 (step SP84).

Subsequently, the control program 51 determines whether the host computer 2 (destination host) as the destination of the corresponding volume 32 has been identified as a result of the reacquisition of the configuration information (step SP85). If the host computer 2 as the destination of the corresponding volume 32 is identified as a result of the reacquisition of the configuration information (step SP85: YES), the control program 51 ends the processing.

If the host computer 2 as the destination of the corresponding volume 32 is not identified (step SP85: NO), the control program 51 commands the apparatus detection program 53 to implement automatic detection processing (step SP86).

Subsequently, the control program 51 determines whether a new host computer 2 has been detected in the automatic detection processing of the host computer 2 implemented by the apparatus detection program 53 (step SP87). If the apparatus detection program 53 did not detect a new host computer 2 (step SP87: NO), the control program 51 ends the processing.

If the apparatus detection program 53 detects a new host computer 2 (step SP87: YES), the control program 51 commands the information acquisition program 52 to acquire the configuration information regarding the detected host computer 2 (step SP88). The information acquisition program 52 acquires the configuration information from the host computer 2, overwrites the acquired configuration information on the acquired information repository 43, and updates the device connection management table 48 (step SP89).

The added component detection processing of the present invention is as described above.

With the computer system 1 according to the present embodiment, by implementing the added component detection processing when a configuration change of the storage apparatus 3 is implemented via the storage management server 5, in a case where the performance value of the components in the storage apparatus 3 to be monitored exceeds a threshold value and the system administrator refers to the threshold exceedance warning screen 81 shown in FIG. 17, even if it is immediately after the system administrator implements a configuration change of the storage apparatus 3 via the storage management server 5 shown in FIG. 5, the configuration information of the host computer 2 using the components in the storage apparatus 3 subject to performance issues can be accurately displayed.

(3) Third Embodiment

The third embodiment of the computer system 2 explains a case where, when the system administrator implements the configuration change of the storage apparatus 3 via the storage management server 5 existing separately from the management server 4, the management server 4 automatically detects the configuration change, uses the iSNS server 6 to acquire an address of the host computer 2 to be connected to the storage apparatus 3, and acquires the configuration information from the storage apparatus 3 and the host computer 2 using that storage apparatus 3.

Figure 27:
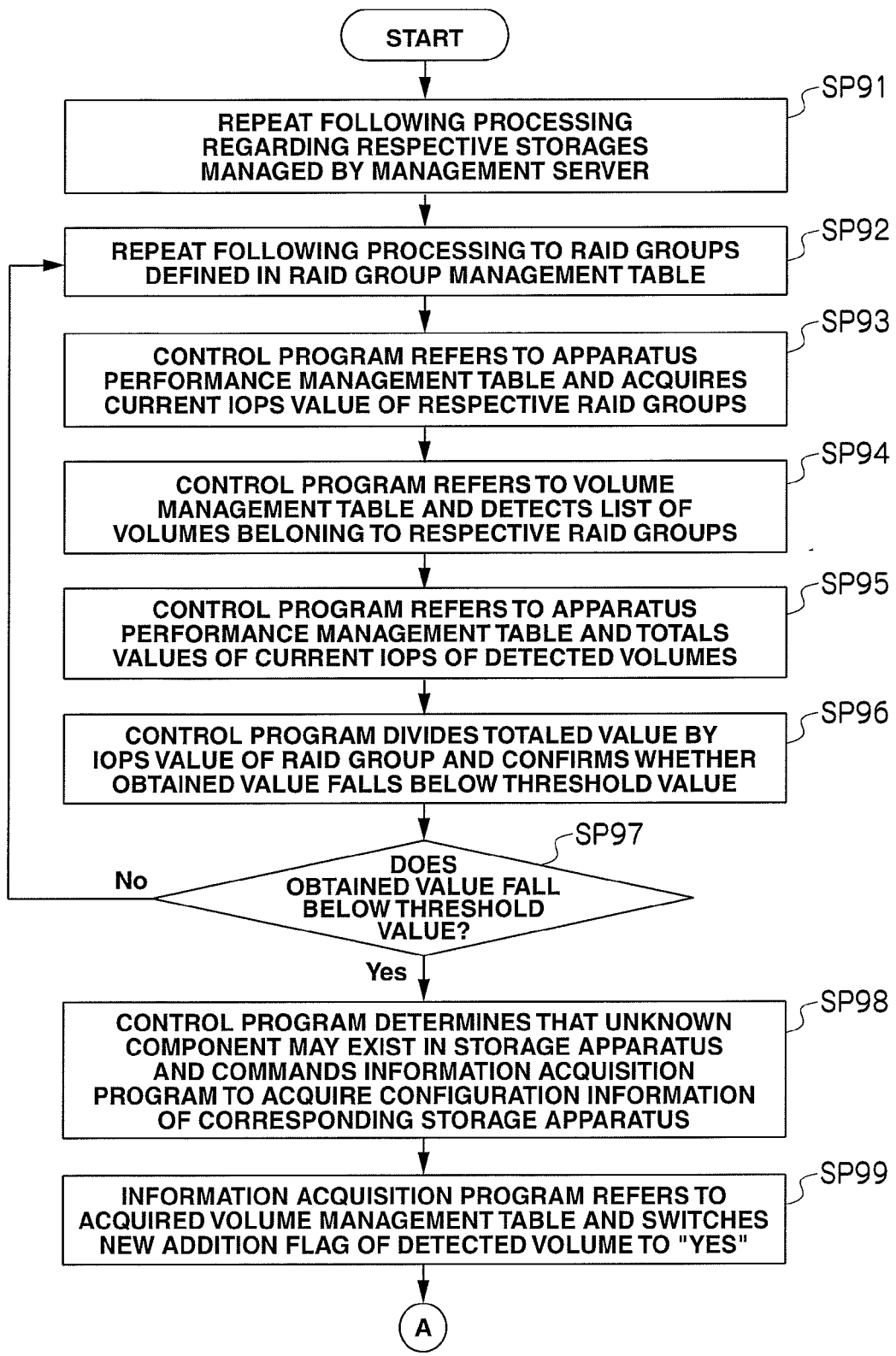
FIG. 27 is a flowchart showing an overall flow example of the added component detection processing to be implemented by the management server in the third embodiment.
Figure 28:
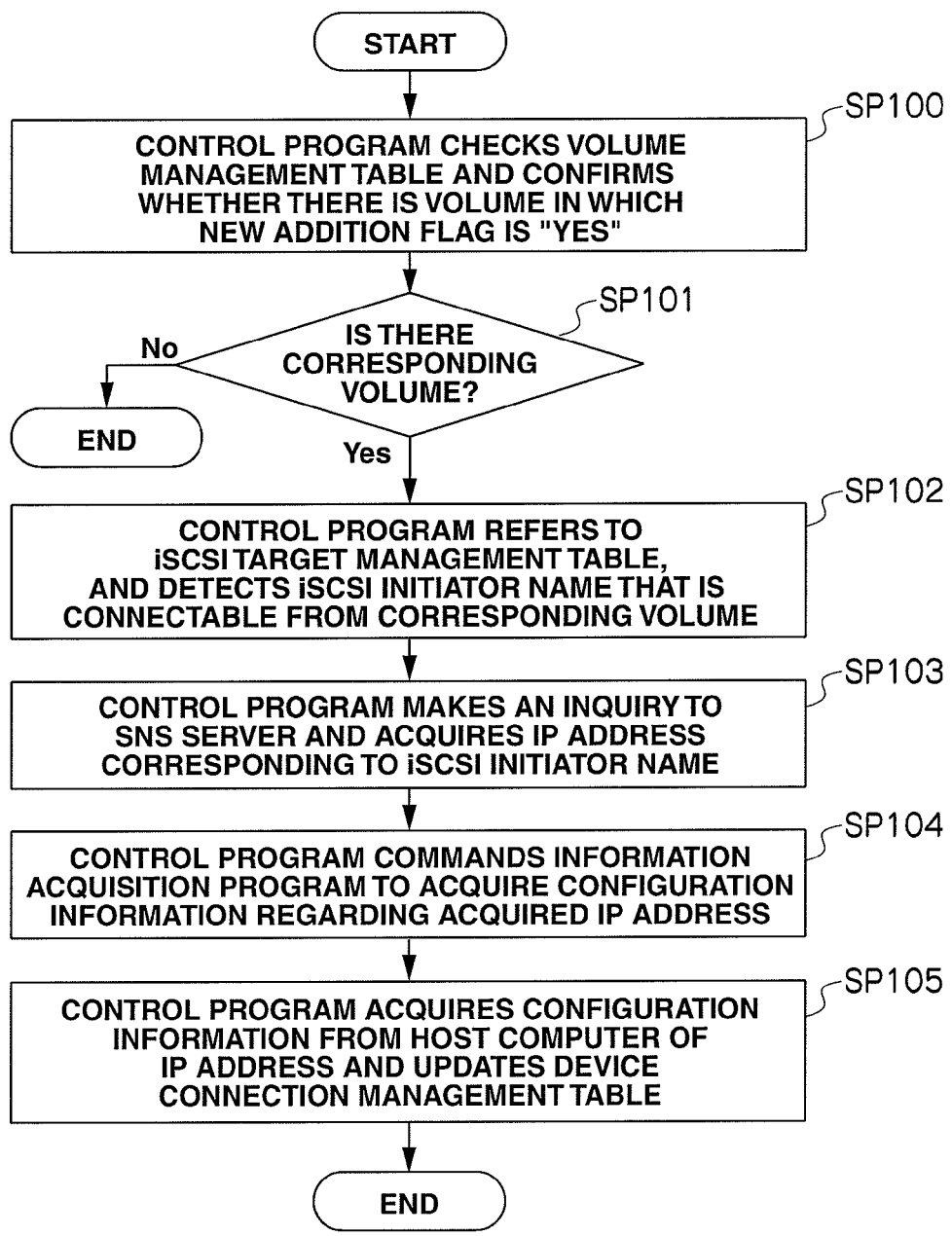
FIG. 28 is a flowchart showing an overall flow example of the added component detection processing to be implemented by the management server in the third embodiment.

FIG. 27 and FIG. 28 show flowcharts of the added component detection processing to be implemented by the control program 51 of the management server 4 according to the present embodiment. Since the processing from step SP91 to step SP101 is the same as step SP71 to step SP81, respectively, of the previous embodiment, the explanation thereof is omitted.

The control program 51 refers to the iSCSI target management table 30 and detects the iSCSI initiator name that is connectable from the corresponding volume 32 (step SP102). Subsequently, the control program 51 makes an inquiry to the iSNS server 6 and acquires the IP address corresponding to the iSCSI initiator name (step SP103). Subsequently, the control program 51 commands the information acquisition program 52 to acquire the configuration information regarding the acquired IP address (step SP104). The information acquisition program 52 acquires the configuration information from the host computer 2 located at the IP address, overwrites the acquired configuration information on the acquired information repository 43, and updates the device connection management table 48 (step SP105).

The added component detection processing of the present embodiment is as described above.

With the computer system 1 according to the present embodiment, by implementing the added component detection processing when a configuration change of the storage apparatus 3 is implemented via the storage management server 5, in a case where the performance value of the components in the storage apparatus 3 to be monitored exceeds a threshold value and the system administrator refers to the threshold exceedance warning screen 81 shown in FIG. 17, even if it is immediately after the system administrator implements a configuration change of the storage apparatus 3 via the storage management server 5 shown in FIG. 5, the configuration information of the host computer 2 using the components in the storage apparatus 3 subject to performance issues can be accurately displayed.

In addition, with the computer system 1 of this embodiment, the load on the management server 4 and the network 7 can be reduced by limiting the number of host computers 2 to be accessed from the management server 4 during the implementation of the added component detection processing.

Like this, with the computer system 1, the management server acquires the configuration information and performance information of the storage apparatus 3 and the host computer 2 respectively at different timings, compares, when a configuration change of the storage apparatus 3 is implemented via the storage management server 5, a performance value of components in the storage apparatus 3 subject to the configuration change and a performance value of components in a connection relationship with those components, determines that an unknown component has been added in the storage apparatus 3 when the difference in the performance values compared is of a certain level or greater, and the reacquires configuration information from the storage apparatus 3.

Accordingly, since the acquisition of the configuration information is limited to the timing of detecting a configuration change in the storage apparatus 3, it is possible to effectively prevent the increase in the frequency of acquiring the configuration information and an excessive load being placed on the storage apparatus 3, and update the configuration information of the storage apparatus 3 to the latest status when the difference in the performance values is of a certain level or greater.

Thereby, even if it is immediately after the implementation of a configuration change, the configuration of that storage apparatus 3 can be accurately displayed to the administrator via the management server 4, and the administrator is able to take appropriate measures against an abnormality in the storage apparatus 3.

The present invention can be broadly applied to management servers for managing a storage system to be used in a computer system.

At least a portion (if not all) of the present invention may be practiced as a software invention, implemented in the form of one or more machine-readable medium having stored thereon at least one sequence of instructions that, when executed, causes a machine to effect operations with respect to the invention. With respect to the term "machine", such term should be construed broadly as encompassing all types of machines, e.g., a non-exhaustive listing including: computing machines, non-computing machines, communication machines, etc. With regard to the term "one or more machine-readable medium", the sequence of instructions may be embodied on and provided from a single medium, or alternatively, differing ones or portions of the instructions may be embodied on and provided from differing and/or distributed mediums. A "machine-readable medium" includes any mechanism that provides (i.e., stores and/or transmits) information in a form readable by a machine (e.g., a processor, computer, electronic device). Such "machine-readable medium" term should be broadly interpreted as encompassing a broad spectrum of mediums, e.g., a non-exhaustive listing including: electronic medium (read-only memories (ROM), random access memories (RAM), flash cards); magnetic medium (floppy disks, hard disks, magnetic tape, etc.); optical medium (CD-ROMs, DVD-ROMs, etc); electrical, optical, acoustical or other form of propagated signals (e.g., carrier waves, infrared signals, digital signals), for example, on a communication medium; etc.

The invention may be implemented using any combination of computer programming software, firmware or hardware.

It should be understood that any software used to implement the present invention is not limited to any specific software or flowchart embodiment described herein, and that other sets of programs or flowcharts or other computer instructions that perform equivalent functions are within a scope of the present invention. Additionally, any separate programs or flowcharts described herein could be entirely integrated into a single program, or any tasks of any one program or flowchart could be integrated into the tasks of multiple programs or any other program to provide a desired set of tasks.

Method embodiments may be emulated as apparatus embodiments (e.g., as a physical apparatus constructed in a manner effecting the method); apparatus embodiments may be emulated as method embodiments. Still further, embodiments within a scope of the present invention include simplistic level embodiments through system levels embodiments.

In concluding, reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment or component, it is submitted that it is within the purview of one skilled in the art to effect such feature, structure, or characteristic in connection with other ones of the embodiments and/or components. Furthermore, for ease of understanding, certain method procedures may have been delineated as separate procedures; however, these separately delineated procedures should not be construed as necessarily order dependent in their performance, i.e., some procedures may be able to be performed in an alternative ordering, simultaneously, etc. Further, unless indicated otherwise, any of the specific procedures may be effected in real-time during operation of any apparatus and/or method.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A computer system, comprising:
a storage apparatus including a plurality of storage devices and including a volume as a storage area to be used by a host computer; and
a management server coupled to the storage apparatus and the host computer via a network and for managing performance information of the storage apparatus and the host computer;
wherein the management server comprises:
an acquisition unit which repeatedly acquires performance information of the storage apparatus and the host computer; and
a comparison unit which compares a performance value of first components in the storage apparatus and a performance value of second components in a connection relationship with the first components; and wherein, to acquire configuration information about the storage apparatus, the acquisition unit determines that an unknown component has been added in the storage apparatus when the difference in the performance values compared with the comparison unit exceeds a predetermined threshold, wherein the comparison unit which acquires the current performance value of each RAID group of the storage apparatus, detects a list of volumes belonging to each RAID group and totals the current IOPS values of the volumes, and confirms whether a value obtained by dividing the totaled IOPS value by the IOPS value of the RAID group exceeds a predetermined threshold.

2. The computer system according to claim 1, wherein the acquisition unit detects a host computer using a storage area of the storage apparatus on the network, and acquires configuration information from the host computer.

3. The computer system according to claim 2, wherein, when the acquisition unit is not able to detect a host computer using a storage area of the storage apparatus on the network, the acquisition unit searches for a new host computer connected to the network, and thereafter detects a host computer using a storage area of the storage apparatus on the network.

4. The computer system according to claim 1, comprising:

an identifier management server which manages an identifier to be used by the host computer when connecting to the storage apparatus, and a network address of the host computer;

wherein the acquisition unit makes an inquiry to the identifier management server on an address of a host computer using a storage area of the storage apparatus, and acquires configuration information from the host computer.

5. A management server connected to a storage apparatus, including a plurality of storage devices, and a host computer via a network, and for managing performance information of the storage apparatus and the host computer, comprising:

an acquisition unit which repeatedly acquires the performance information of the storage apparatus and the host computer; and a comparison unit which compares a performance value of first components in the storage apparatus and a performance value of second components in a connection relationship with the first components; and wherein, to acquire configuration information about the storage apparatus, the acquisition unit determines that an unknown component has been added in the storage apparatus when the difference in the performance values compared with the comparison unit exceeds a predetermined load;

wherein the comparison unit which acquires the current performance value of each RAID group of the storage apparatus, detects a list of volumes belonging to each RAID group and totals the current IOPS values of the volumes, and confirms whether a value obtained by dividing the totaled IOPS value by the IOPS value of the RAID group exceeds a predetermined threshold.

6. The management server according to claim 5, wherein the acquisition unit detects a host computer using a storage area of the storage apparatus on the network, and acquires configuration information from the host computer.

7. The management server according to claim 6, wherein, when the acquisition unit is not able to detect a host computer using a storage area of the storage apparatus on the network, the acquisition unit searches for a new host computer connected to the network, and thereafter detects a host computer using a storage area of the storage apparatus on the network.

8. The management server according to claim 5, wherein the acquisition unit makes an inquiry to an identifier management server, which manages an identifier to be used by the host computer when connecting to the storage apparatus and a network address of the host computer, on an address of a host computer using a storage area of the storage apparatus, and acquires configuration information from the host computer.

9. A performance information acquisition method of a management server connected to a storage apparatus, including a plurality of storage device, and a host computer via a network, and for managing performance information of the storage apparatus and the host computer, comprising:

a first step of an acquisition unit repeatedly acquiring the performance information of the storage apparatus and the host computer;

a second step of a comparison unit for comparing a performance value of first components in the storage apparatus and a performance value of second components in a connection relationship with the first components; and a third step, for acquiring configuration information about the storage apparatus, by the acquisition unit determining that an unknown component has been added in the storage apparatus when the difference in the performance values compared at the second step exceeds a predetermined threshold;

wherein, at the second step, the current performance value of each RAID group of the storage apparatus is acquired, a list of volumes belonging to each RAID group is detected and the current IOPS values of the volumes are totaled, and whether a value obtained by dividing the totaled IOPS value by the IOPS value of the RAID group exceeds a predetermined threshold value is confirmed.

10. The performance information acquisition method according to claim 9, wherein, at the third step, a host computer using a storage area of the storage apparatus on the network is detected, and configuration information is acquired from the host computer.

11. The performance information acquisition method according to claim 10, wherein, at the third step, when it is not possible to detect a host computer using a storage area of the storage apparatus on the network, a new host computer connected to the network is searched, and a host computer using a storage area of the storage apparatus on the network is thereafter detected.

12. The performance information acquisition method according to claim 9, wherein, at the third step, an inquiry is made to an identifier management server, which manages an identifier to be used by the host computer when connecting to the storage apparatus and a network address of the host computer, on an address of a host computer using a storage area of the storage apparatus, and configuration information is acquired from the host computer.

13. The computer system according to claim 2, wherein the management server is also configured to manage the configuration information, wherein the comparison unit is configured to compare the performance values of the first and second components when a configuration change of the storage apparatus is commanded externally, and wherein the acquisition unit is configured to reacquire confirmation information from the storage apparatus when the difference in the performance values compared with the comparison unit exceed the predetermined threshold.

14. The management server according to claim 6, wherein the management server is also configured to manage the configuration information, wherein the comparison unit is configured to compare the performance values of the first and second components when a configuration change of the storage apparatus is commanded externally, and wherein the acquisition unit is configured to reacquire confirmation information from the storage apparatus when the difference in the performance values compared with the comparison unit exceed the predetermined threshold.

15. The method according to claim 10, wherein, at the second step, the comparing of performance values is performed when a configuration change of the storage apparatus is externally commanded, and, at the third step, when the difference in the performance values compared in the third step exceed the predetermined threshold, configuration information from the storage apparatus is reacquired.

16. The computer system according to claim 1, wherein the acquisition unit is configured to repeatedly acquire configuration information about the storage apparatus and, when it is determined by the acquisition unit that an unknown component has been added in the storage apparatus, the acquisition unit is configured to reacquire configuration information about the storage unit to which the unknown component has been added.

17. The management server according to claim 5, wherein the acquisition unit is configured to repeatedly acquire configuration information about the storage apparatus and, when it is determined by the acquisition unit that an unknown component has been added in the storage apparatus, the acquisition unit is configured to reacquire configuration information about the storage unit to which the unknown component has been added.

18. The method according to claim 9 wherein, in the first step, the acquisition unit repeatedly acquires configuration information of the storage apparatus and the computer, and wherein, in the third step, the acquisition unit reacquires configuration information about the storage unit, to which the unknown component has been added, after it is determined by the acquisition unit that the unknown component has been added in the storage apparatus.

* * * * *